US008228542B2

(12) United States Patent
Coley et al.

(10) Patent No.: US 8,228,542 B2
(45) Date of Patent: Jul. 24, 2012

(54) SYSTEMS AND METHODS FOR STORING MULTIPLE RECORDS USING IDENTIFIERS, STORAGE LOCATIONS, AND ATTRIBUTES ASSOCIATED WITH ELECTRONIC DOCUMENTS

(75) Inventors: M. Shane Coley, Winder, GA (US); Daniel M. Blechinger, Auburn, GA (US)

(73) Assignee: 1st Management Services, Inc., Atlanta, GA (US)

( * ) Notice: Subject to any disclaimer, the term of this patent is extended or adjusted under 35 U.S.C. 154(b) by 785 days.

(21) Appl. No.: 12/415,625

(22) Filed: Mar. 31, 2009

(65) Prior Publication Data

US 2010/0245938 A1    Sep. 30, 2010

(51) Int. Cl.
  *H04N 1/21*    (2006.01)
  *G06F 17/30*    (2006.01)
(52) U.S. Cl. ...... 358/1.15; 358/1.16; 358/403; 382/305; 707/821
(58) Field of Classification Search ............ 358/1.1, 358/1.9, 1.2, 1.15–1.18, 400–404, 444, 524; 382/224, 305, 306; 707/821, 822, 915, 999.107; 715/225, 229
See application file for complete search history.

(56) References Cited

U.S. PATENT DOCUMENTS

| 5,720,036 | A | 2/1998 | Garfinkle et al. |
| 7,039,856 | B2 * | 5/2006 | Peairs et al. ............ 715/229 |
| 7,880,922 | B2 * | 2/2011 | Onishi ................ 358/1.2 |
| 7,984,027 | B2 * | 7/2011 | Tamura ................ 358/403 |
| 8,051,035 | B2 * | 11/2011 | Flynn et al. ............ 707/821 |
| 2003/0101199 | A1 | 5/2003 | Briggi |
| 2006/0085676 | A1 | 4/2006 | Kobayashi et al. |
| 2006/0279785 | A1 * | 12/2006 | Onishi et al. ............ 358/1.15 |
| 2006/0285168 | A1 * | 12/2006 | Horino et al. ........... 358/1.15 |
| 2007/0112850 | A1 * | 5/2007 | Flynn et al. ............ 707/104.1 |
| 2008/0075395 | A1 * | 3/2008 | Wallace et al. ........... 382/305 |
| 2010/0250631 | A1 * | 9/2010 | Kawaharada ............ 707/822 |
| 2011/0205576 | A1 * | 8/2011 | Halron et al. ........... 358/1.15 |

* cited by examiner

*Primary Examiner* — Scott A Rogers
(74) *Attorney, Agent, or Firm* — Alston & Bird LLP

(57) ABSTRACT

Various embodiments of the present invention provide systems and methods for storing electronic documents. In particular, various embodiments provide systems and methods that use profiles defining one or more attributes to generate file names and folders for storing the electronic documents. Further embodiments provide systems and methods for storing one or more records related to the electronic documents in one or more tables based on the profiles. In various embodiments, these records are used to manage the storage of the documents in the system and to help in locating and retrieving the documents from the system.

23 Claims, 25 Drawing Sheets

Profile List

| Status | ID | Profile Name | Storage Location | Versioning | Folder Mask | File Mask |
|---|---|---|---|---|---|---|
| Active | 367 | Accounts Payable | \prod-nas-01\DocStor_DriveSave All | AP Invoices | AP Invoice Name |
| Active | 369 | Cash Receipts | \prod-nas-01\DocStor_DriveSave All | Cash Receipts | Cash Receipts |
| Active | 380 | Contractors | \prod-nas-01\DocStor_DriveSave All | Contractors | Sales Candidates |
| Active | 375 | Copy Tickets | \prod-nas-01\DocStor_DriveSave All | Copy Tickets | Copy Tickets |
| Active | 355 | Current Employee | \prod-nas-01\DocStor_DriveSave All | Current Employee | Employee Name Last, First, ID & Doc Group |
| Active | 362 | Forms Management | \prod-nas-01\DocStor_DriveSave One version | Forms Management | Original File Name |
| Active | 374 | Legal | \prod-nas-01\DocStor_DriveSave All | Legal | Legal |
| Active | 366 | Not Hired Candidates | \prod-nas-01\DocStor_DriveSave One version | Not Hired Interview Documents | Last Name, First Name, Not Hired Folder |
| Active | 378 | Payroll | \prod-nas-01\DocStor_DriveSave All | Payroll | Payroll |
| Active | 365 | Proposals | \prod-nas-01\DocStor_DriveSave One version | IST Proposals | IST Proposals |
| Active | 372 | Sales Candidates | \prod-nas-01\DocStor_DriveSave All | Sales Candidates | Sales Candidates |
| Active | 357 | Server Documents | \prod-nas-01\DocStor_DriveSave One version | Server Documents | Server Document Names |
| Active | 354 | Terminated Employee | \prod-nas-01\DocStor_DriveSave All | Terminated Employee | Employee Name Last, First, ID & Doc Group |
| Closed | 358 | AR | \prod-nas-01\DocStor_DriveSave One version | AR_Path_Mask | AR_Name_Mask |

FIG. 10

| Profile List | | | | | |
|---|---|---|---|---|---|
| Status | ID | Profile Name | Storage Location | Versioning | Folder Mask | File Mask |
| Active | 367 | Accounts Payable | \\prod-nas-01\DocStor_DriveSave All | | AP Invoices | AP Invoice Name |
| Active | 369 | Cash Receipts | \\prod-n... | Cash Receipts | Cash Receipts | Cash Receipts |
| Active | 380 | Contractors | \\prod-n... | Edit Profile | Contractors | Sales Candidates |
| Active | 375 | Copy Tickets | \\prod-n... | New Profile | Copy Tickets | Copy Tickets |
| Active | 355 | Current Employee | \\prod-n... | Edit Folder Mask | Current Employee | Employee Name Last, First, ID & Doc Group |
| Active | 362 | Forms Management | \\prod-n... | Edit File Mask | sionForms Management | Original File Name |
| Active | 374 | Legal | \\prod-n... | Edit Variable Rules | Legal | Legal |
| Active | 366 | Not Hired Candidates | \\prod-n... | Edit Storage Machine | sionNot Hired Interview DocumentsLast Name, First Name, Not Hired Folder |
| Active | 378 | Payroll | \\prod-n... | Edit Storage Device | Payroll | Payroll |
| Active | 365 | Proposals | \\prod-n... | List Version Rules | sionIST Proposals | IST Proposals |
| Active | 372 | Sales Candidates | \\prod-n... | Drop Dynamic Search Table | Sales Candidates | Sales Candidates |
| Active | 357 | Server Documents | \\prod-n... | | sionServer Documents | Server Document Names |
| Active | 354 | Terminated Employee | \\prod-nas-01\DocStor_DriveSave One Version | Terminated Employee | Employee Name Last, First, ID & Doc Group |
| Closed | 358 | AR | \\prod-nas-01\DocStor_DriveSave One VersionAR_Path_Mask | AR_Name_Mask |

Build Access Groups
Access Group [EDIT/ADD User Team] [EDIT/ADD Access Group]
Org Filter: [ ]  Access Group Filter: [ ] Search HR Demo -- [MyOrg Administrator AG] ▼
HR Demo ---> MyOrg Administrator AG
  Unique Users [1]   All Memberships                    UN-Link
Access Group Members [1]                                Remove
User Team Name
MyOrg Administrator UT       [Members: 1]

Available User Teams [5]
User Team Name                      Members      Link
New User Group Name                  - 0 -    Add
Regional Manager UT                   [3]     Add    Add ALL
Site Manager UT                       [4]     Add    Add ALL
System Wide Auth Admin UT             [3]     Add    Add ALL
System Wide DocStor Admin UT          [4]     Add 1901 — (points to Access Group dropdown)
1902 — (points to Access Group Members)
1903 — (points to Available User Teams)

SYSTEMS AND METHODS FOR STORING MULTIPLE RECORDS USING IDENTIFIERS, STORAGE LOCATIONS, AND ATTRIBUTES ASSOCIATED WITH ELECTRONIC DOCUMENTS

BACKGROUND OF THE INVENTION

The organized storage of documents electronically has become of increasing importance to a number of organizations over recent years. Many of these organizations make use of document management systems that are mainly comprised of a computer system used to track and store electronic documents or images of documents in some type of storage medium. For example, a law firm may employ such a system to store any number of documents related to litigation or other matters handled by the law firm.

In the development of such systems, various components of the system must be carefully considered to ensure a robust system for storing electronic documents. For instance, the process used to organize and to index documents stored in the system must be carefully established to ensure that the stored documents can be later retrieved. In addition, the process and tools used for document storage and retrieval must be carefully developed so that retrieval of stored documents is accurate and efficient. Furthermore, the process and mechanisms used to secure the stored documents must be thoroughly installed to prevent unauthorized reading, modifying, and/or destroying of documents.

Thus a need exists for a document management system that better organizes and indexes electronic documents stored within the system. In addition, a need exists for a document management system that includes better security mechanisms that provide more reliable security for the documents stored in the system.

BRIEF SUMMARY OF VARIOUS EMBODIMENTS OF THE INVENTION

A computer system for storing a plurality of electronic documents includes a first dynamic storage profile table, a second dynamic storage profile table, memory, and at least one processor coupled to the memory that is adapted to execute an upload module and a profile module. In various embodiments, the upload module is adapted to receive an electronic document that is associated with a first profile, the first profile defining a first set of one or more attributes. In various embodiments, the electronic document may include one or more files. For example, in one embodiment, the electronic document may include an OCR file, an attribute file, and an image file.

Furthermore, the upload module according to various embodiments is adapted to identify values associated with the electronic document for at least one attribute of the first set of attributes, to upload the electronic document to the memory, and to store the electronic document in a storage medium. In various embodiments, the profile module is further adapted to store a first record associated with the electronic document in a first table. The first record according to particular embodiments includes: (a) a document identifier that identifies the electronic document; (b) a location identifier that identifies a storage location of the electronic document; and (c) a first profile identifier that is associated with the first profile and identifies the first dynamic storage profile table.

In various embodiments, the profile module is also adapted to store a second record in a second table. In particular embodiments, the second record is a record for at least one attribute of the first set of attributes and includes: (a) the document identifier; (b) the first profile identifier; (c) a first attribute identifier that identifies the particular attribute of the first set of attributes; and (d) the value for the particular attribute.

In addition, in various embodiments, the profile module is further adapted to store a third record in the first dynamic storage profile table. In various embodiments, the first dynamic storage profile table includes a field for each attribute of the first set of attributes stored in the second table for the electronic document, and the third record includes: (a) the document identifier; and (b) the identified value stored in the corresponding field for each attribute of the first attributes stored in the second table for the electronic document.

In various embodiments, it may be desirable to change the electronic document from the first profile to a second profile. Thus, in various embodiments, the profile module is further adapted to receive input to associate the electronic document with the second profile, the second profile defining a second set of one or more attributes.

In response to receiving the input to associate the electronic document with a second profile, the profile module according to various embodiments is adapted to receive values associated with the electronic document for at least one attribute of the second set of attributes. Furthermore, in various embodiments, the profile module is adapted to: (a) update the first record in the first table with a second profile identifier that is associated with the second profile and identifies the second dynamic storage profile table, (b) store a fourth record for at least one attribute of the second set of attributes in the second table, wherein the fourth record includes: (1) the document identifier; (2) the second profile identifier, (3) a second attribute identifier that identifies the particular attribute; and (4) the value for the particular attribute, and (c) store a fifth record in the second dynamic storage profile table, wherein the second dynamic storage profile table includes a field for each attribute of the second set of attributes stored in the second table for the electronic document, and the fifth record includes: (1) the document identifier; and (2) the identified value stored in the corresponding field for each attribute of the second attributes stored in the second table for the electronic document. In particular embodiments, the dynamic storage profile tables are adapted to be searched based on the values stored in each field to identify and to locate the electronic document.

In particular embodiments, the profile module is also adapted to automatically generate a first set of one or more folders on the storage medium based on the identified value for at least one attribute of the first set of attributes defined for the first profile. In addition, in various embodiments, the profile module is adapted to automatically generate a file name assigned to the electronic document based on the identified value for at least one attribute of the first set of attributes defined for the first profile. Furthermore, in various embodiments, the profile module is adapted to store the electronic document in a particular folder of the first set of folders. In various embodiments, the location identifier stored in the first table identifies the particular folder in the first set of folders.

Furthermore, in particular embodiments, the profile module is also adapted to, in response to receiving input to associate the electronic document with the second profile: (1) automatically generate a second set of one or more folders on the storage medium based on the identified value for at least one attribute of the second set of attributes defined for the second profile; (2) automatically generate a file name assigned to the electronic document based on the identified value for at least one attribute of the second set of attributes defined for the first profile; (3) store the electronic document in a particular folder of the second set of folders; and (4) update the first record in the first table with a second location identifier that identifies the particular folder of the second set of one or more folders.

In further embodiments, the upload module is adapted to determine a value signifying that the first profile is correctly associated with the electronic document based on values being identified for one or more attributes of the first set of attributes defined for the first profile. Further, in various embodiments, the upload module is adapted to automatically upload the electronic document to memory in response to the value exceeding a predetermined threshold. In addition, in various embodiments, the upload module is further adapted to select the first profile from a set of one or more profiles based on the values being identified for one or more attributes of the first set of attributes defined for the first profile.

In various embodiments, the system further includes a scanner and a scan module. In various embodiments, the scanner is adapted to scan a physical document that corresponds to the electronic document. Furthermore, in various embodiments, the scan module is adapted to: (1) generate the electronic document based on the physical document; (2) perform optical character recognition on the electronic document to identify at least a portion of the values associated with the first set of attributes defined in the first profile; and (3) locate the portion of the values on the electronic document based on a set of rules defined in the first profile.

In addition, in various embodiments, the first profile incorporates processing rules that include code to verify that values for one or more attributes of the first set of attributes have been identified. In various embodiments, the profile module is adapted to execute the processing rules prior to storing the electronic document, and in response to the values for the one or more attributes not being verified, not store the electronic document in the storage medium. Furthermore, in various embodiments, processing rules may include code to obtain values for one or more attributes of the first set of one or more attributes from an external resource. In these particular embodiments, the profile module is adapted to execute the processing rules to obtain the values for the one or more attributes prior to storing the electronic document in the storage medium.

Further embodiments include a computer-readable medium storing computer-executable instructions. In various embodiments the executable instructions are adapted for, in response to receiving an electronic document that is associated with a first profile defining a first set of one or more attributes, identifying values associated with the electronic document for at least one attribute of the first set of attributes defined for the first profile. In various embodiments, the executable instructions are further adapted for storing the electronic document in a storage medium.

In various embodiments, the executable instructions are adapted for storing a first record associated with the electronic document in a first table. In various embodiments, the first record includes: (a) a document identifier that identifies the electronic document; (b) a location identifier that identifies a storage location of the electronic document; and (c) a first profile identifier that is associated with the first profile and identifies the first dynamic storage profile table. In various embodiments, the executable instructions are also adapted for storing a second record in a second table. In various embodiments, the second record is a record for at least one attribute of the first set of attributes defined for the first profile. In addition, in various embodiments, the second record includes: (a) the document identifier; (b) the first profile identifier; (c) a first attribute identifier that identifies the particular attribute of the first set of attributes; and (d) the value for the particular attribute. In various embodiments, the executable instructions are also adapted for storing a third record in the first dynamic storage profile table. In various embodiments, the first dynamic storage profile table includes a field for each attribute of the first set of attributes stored in the second table for the electronic document, and the third record includes: (a) the document identifier; and (b) the identified value stored in the corresponding field for each attribute of the first set of stored in the second table for the electronic document.

Furthermore, in various embodiments, the executable instructions are adapted for, in response to receiving input to associate the electronic document with a second profile, receiving values associated with the electronic document for at least one attribute of the second set of one or more attributes defined for the second profile. In various embodiments, the executable instructions are further adapted for updating the first record in the first table with a second profile identifier that is associated with the second profile and identifies the second dynamic storage profile table. In addition, in various embodiments, the executable instructions are adapted for storing a fourth record for at least one attribute of the second set of attributes defined for the second profile in the second table. In various embodiments, the fourth record includes: (a) the document identifier; (b) the second profile identifier; (c) a second attribute identifier that identifies the particular attribute of the second set of attributes; and (d) the value of the identified values identified for the particular attribute. In addition, in various embodiments, the executable instructions are adapted for storing a fifth record in the second dynamic storage profile table. In various embodiments, the second dynamic storage profile table includes a field for each attribute of the second set of attributes stored in the second table for the electronic document, and the fifth record includes: (a) the document identifier; and (b) the identified value stored in the corresponding field for each attribute of the second set of attributes stored in the second table for the electronic document.

BRIEF DESCRIPTION OF THE DRAWINGS

Figure 1:
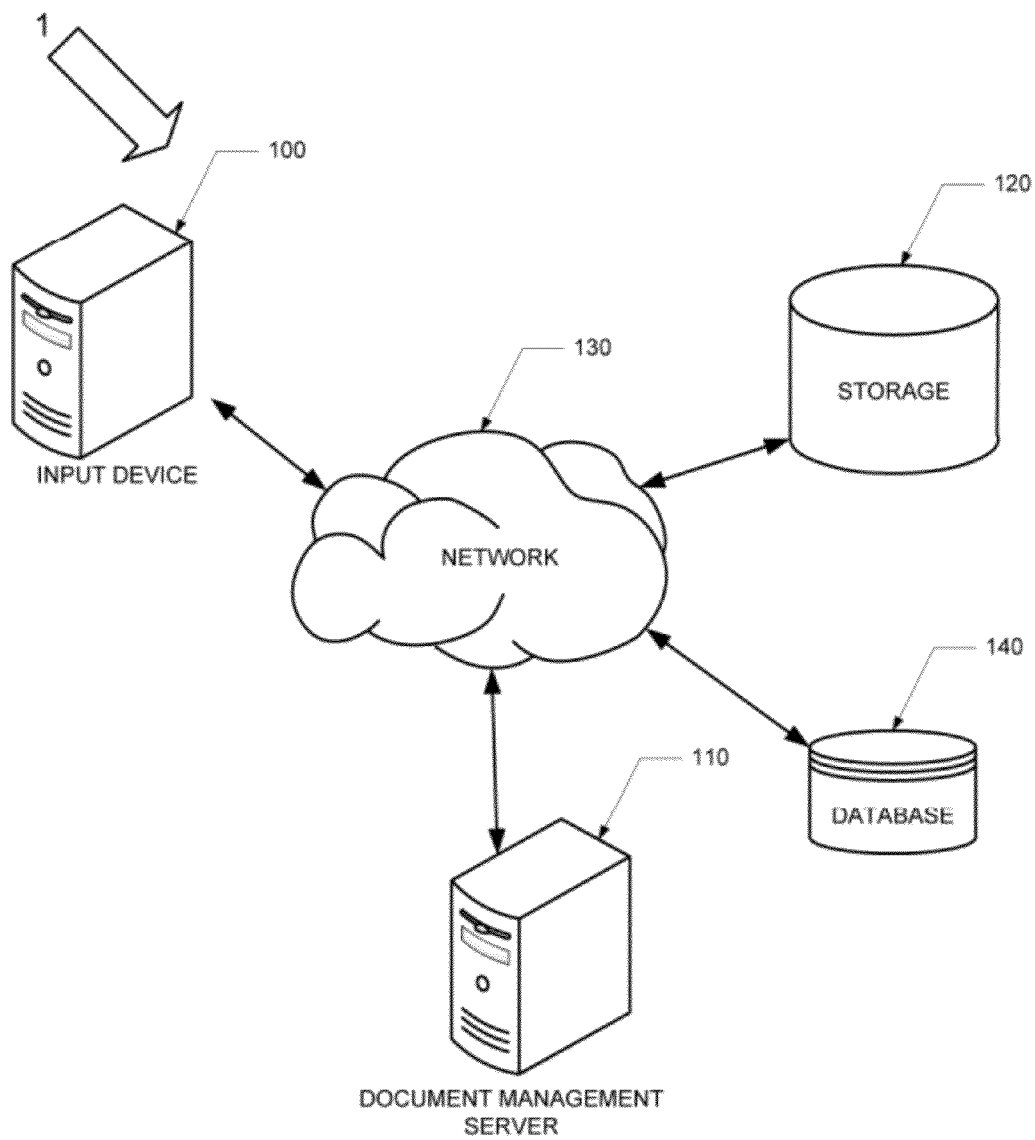

Having thus described various embodiments of the invention in general terms, reference will now be made to the accompanying drawings, which are not necessarily drawn to scale, and wherein:

FIG. 1 illustrates a schematic diagram illustrating a document management system according to various embodiments of the invention.

Figure 2:
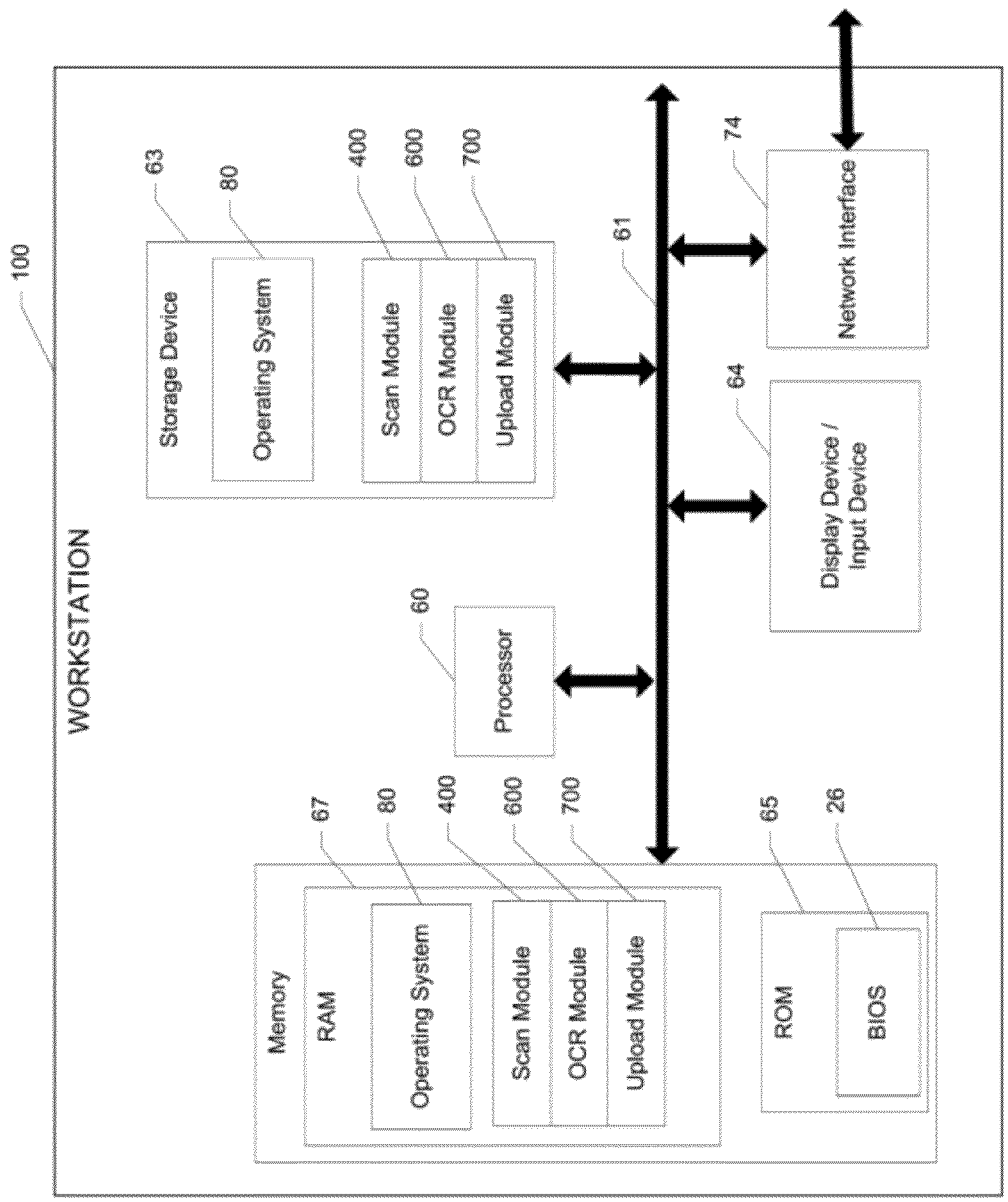

FIG. 2 illustrates a schematic diagram illustrating an input device according to various embodiments of the invention.

Figure 3:
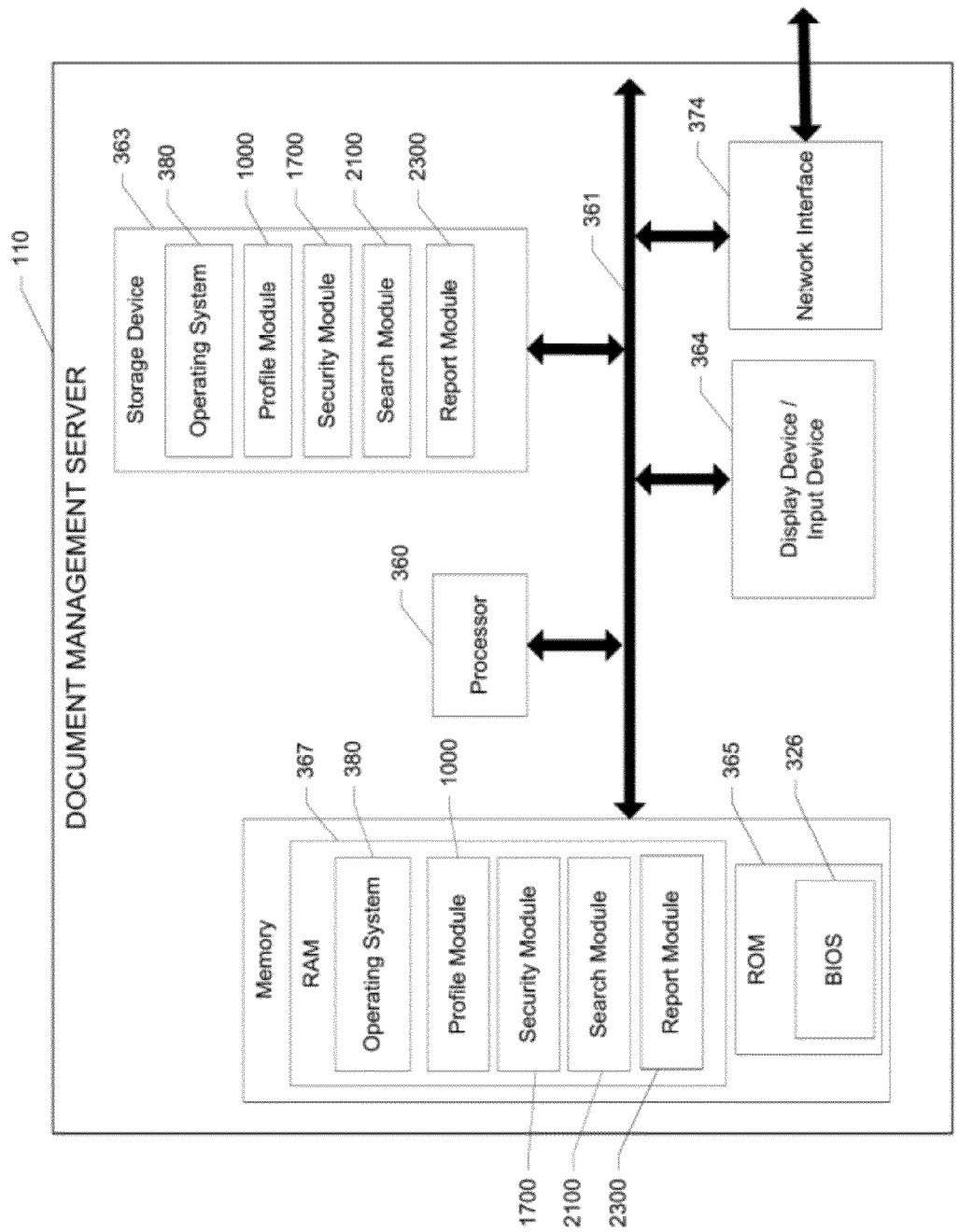

FIG. 3 illustrates a schematic diagram illustrating a document management server according to various embodiments of the invention.

Figure 4:
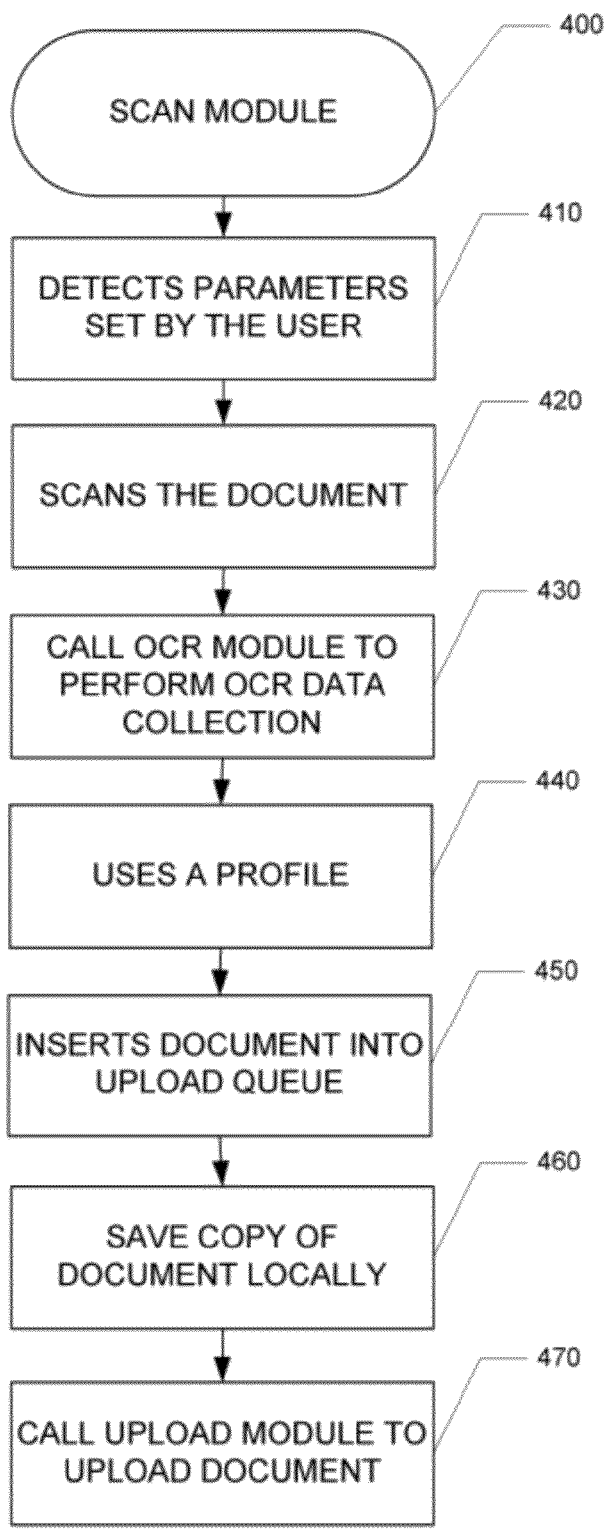

FIG. 4 illustrates a flow diagram of a scan module according to various embodiments of the invention.

Figure 5:
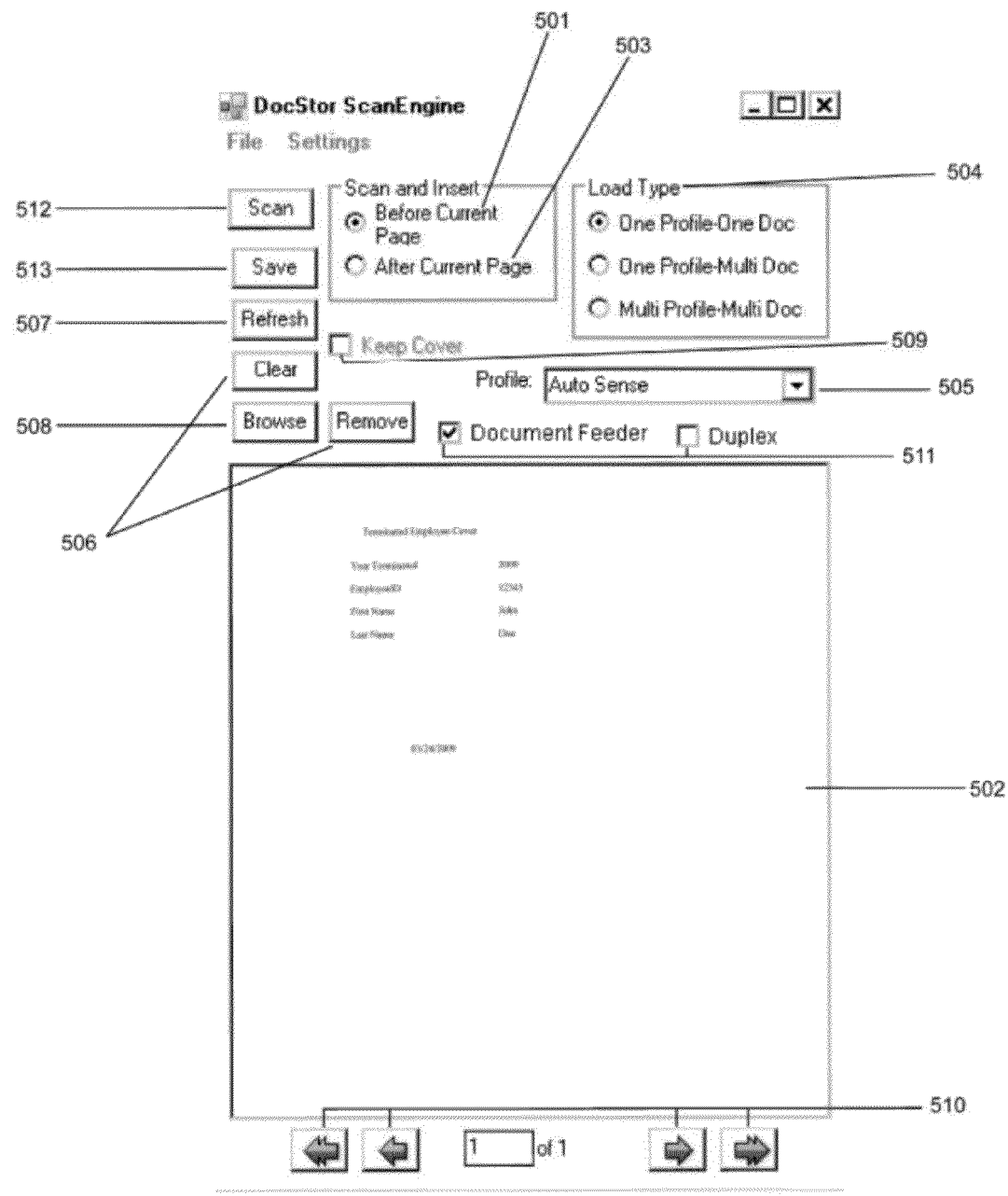

FIG. 5 illustrates a screen used for scanning documents according to various embodiments of the invention.

Figure 6:
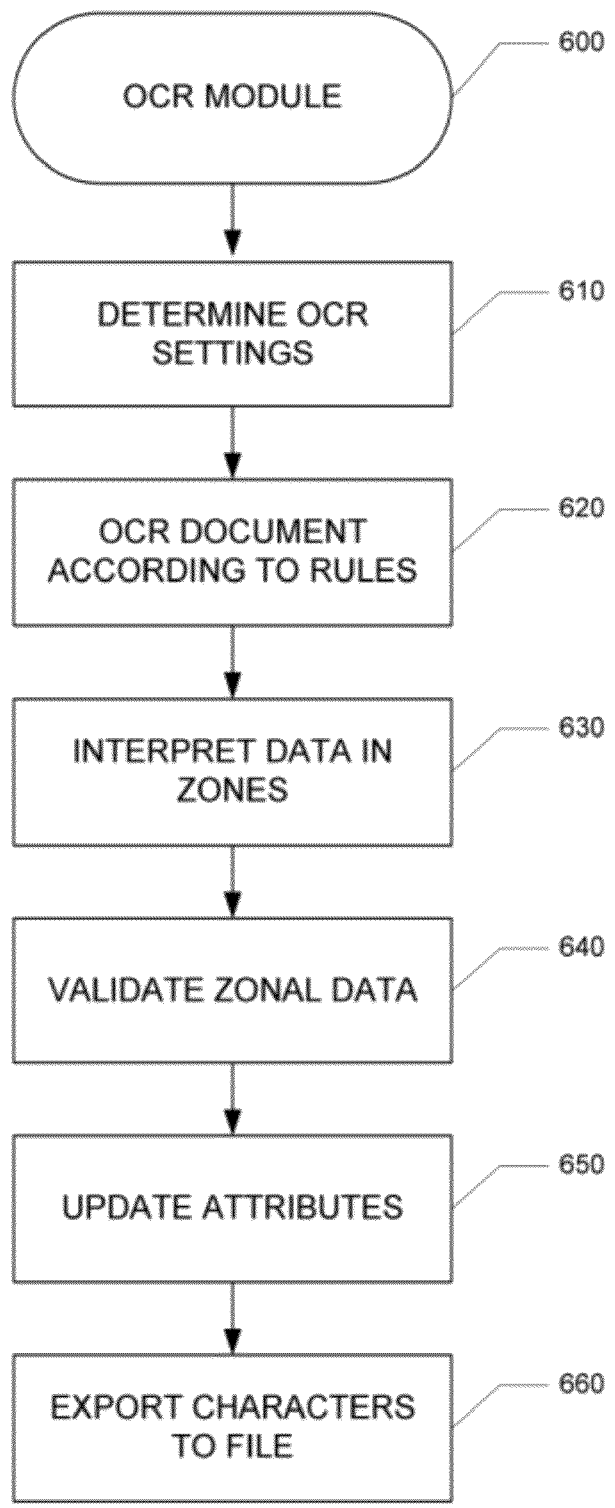

FIG. 6 illustrates a flow diagram of an optical character recognition (OCR) module according to various embodiments of the invention.

Figure 7:
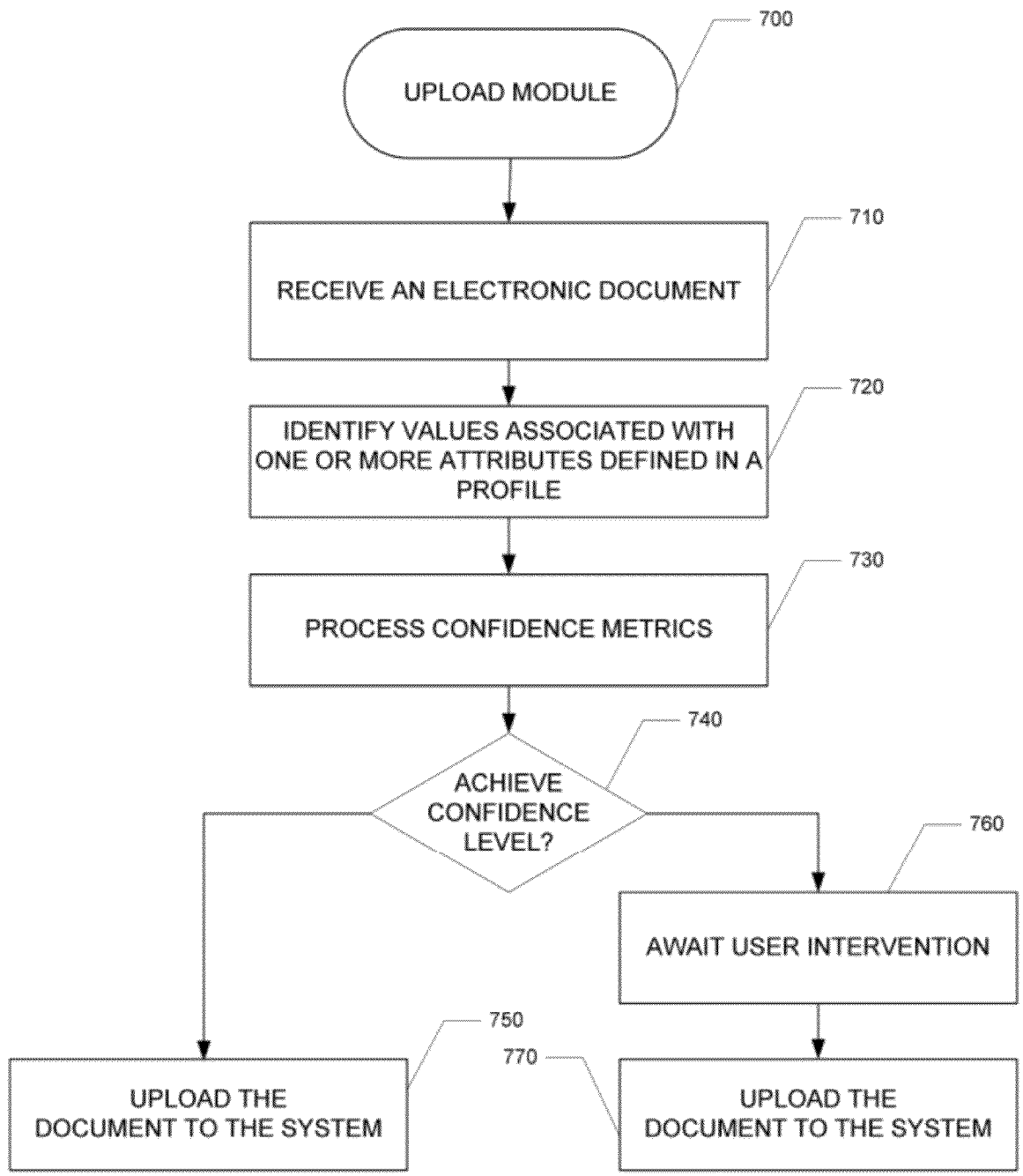

FIG. 7 illustrates a flow diagram of an upload module according to various embodiments of the invention.

Figure 8:
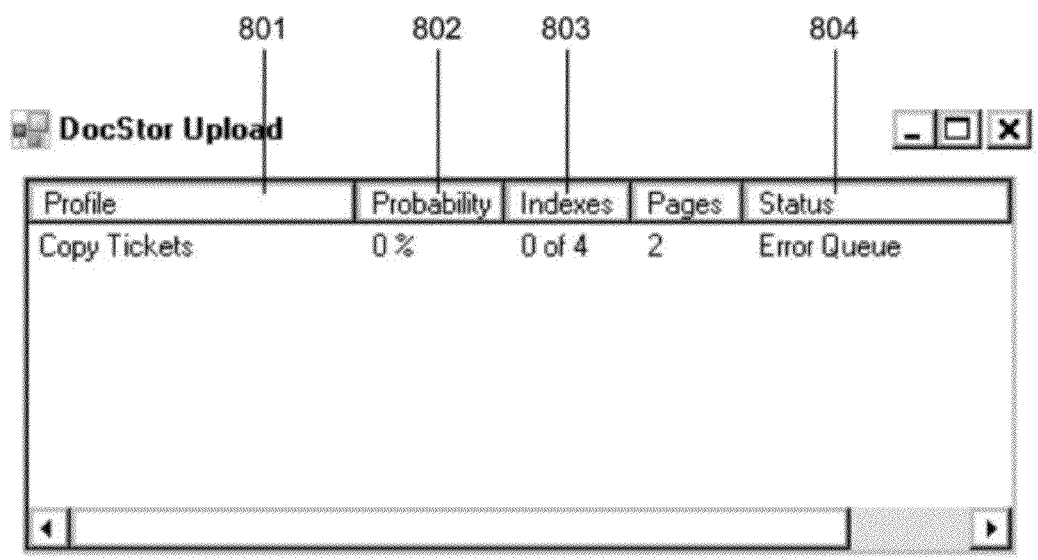

FIG. 8 illustrates a screen providing a status of documents as they are uploaded according to various embodiments of the invention.

Figure 9:
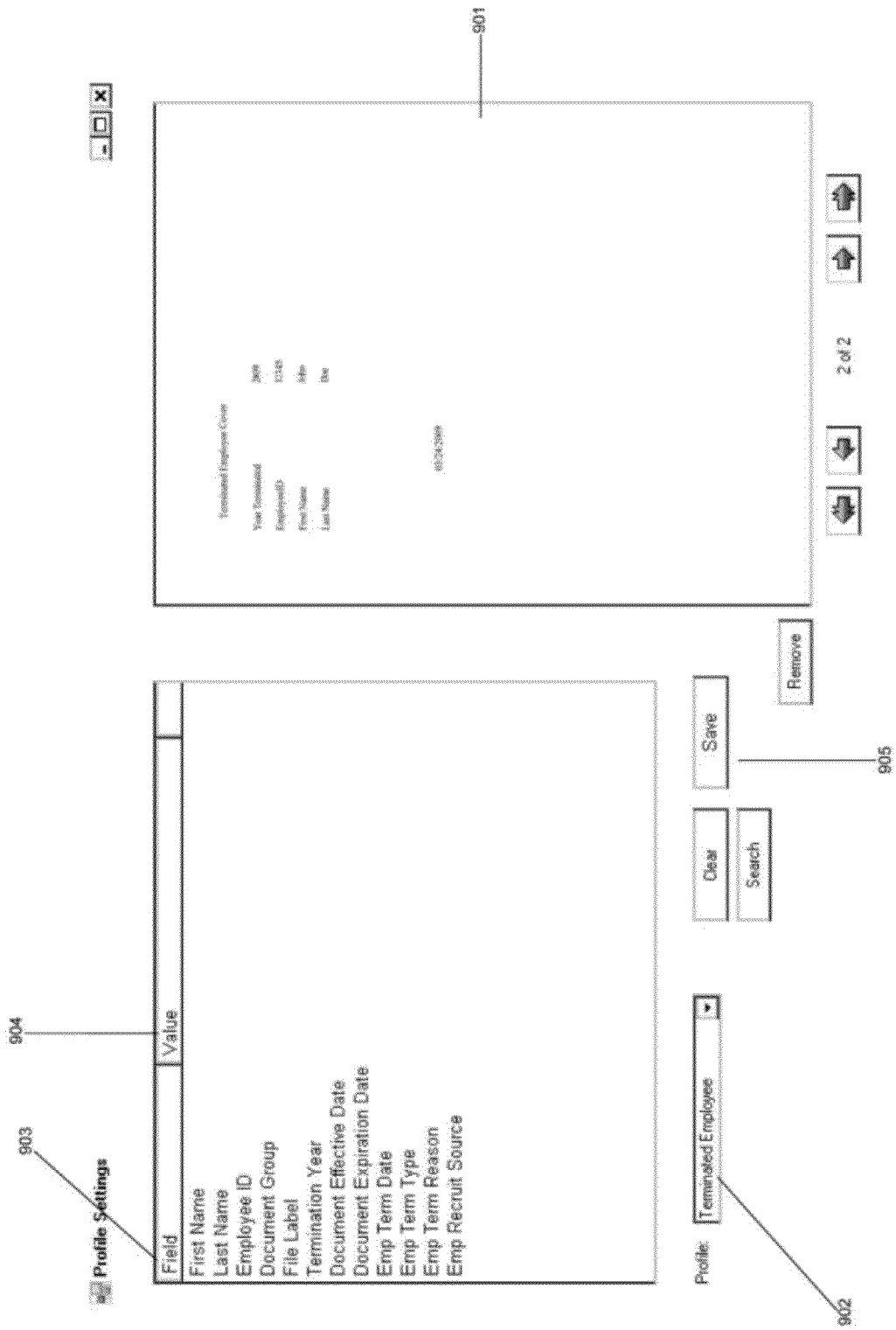

FIG. 9 illustrates a screen displayed once a user has doubled clicked on a document in an "Error Queue" according to various embodiments of the invention.

FIG. 10 illustrates a screen for setting up a new profile according to various embodiments of the invention.

FIG. 11 illustrates an additional screen for setting up a new profile according to various embodiments of the invention.

Figure 12:
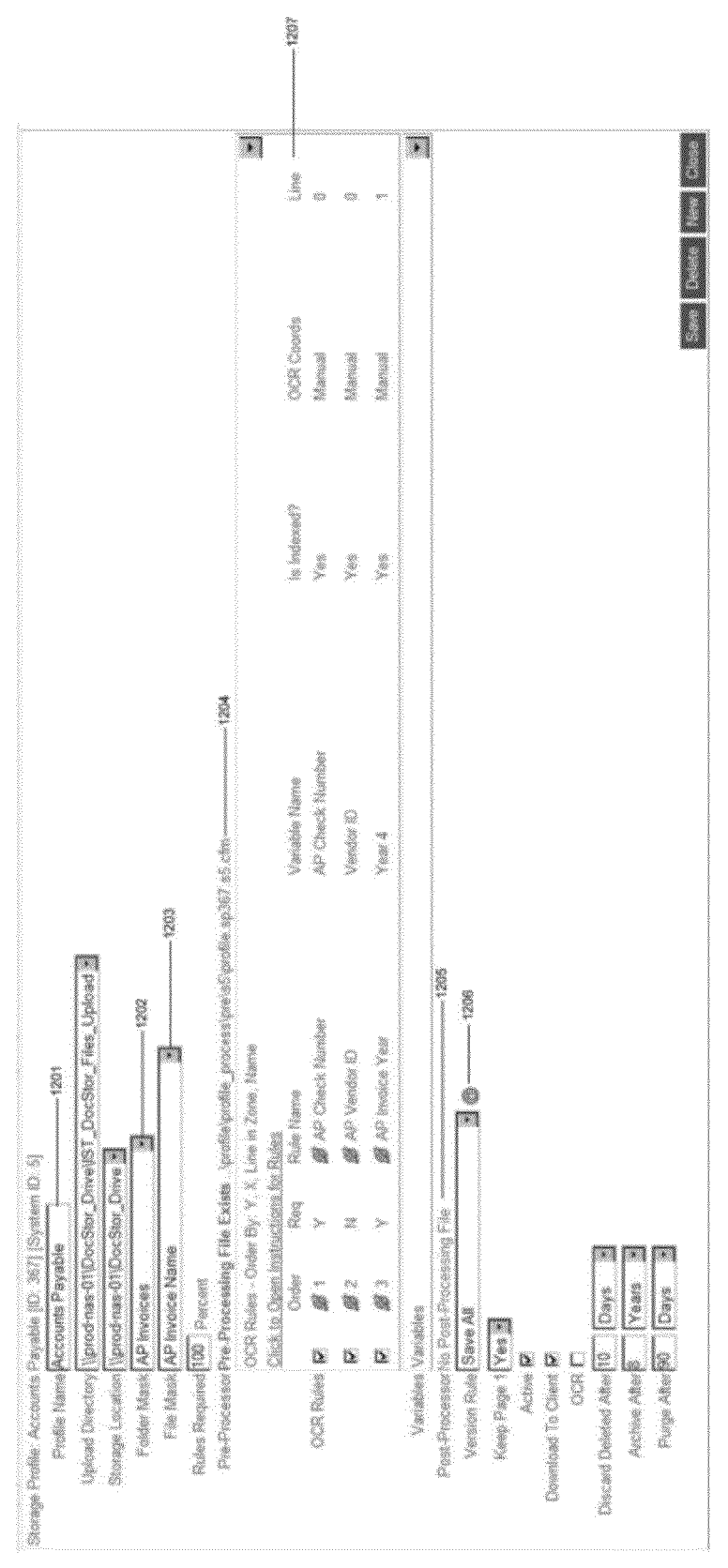

FIG. 12 illustrates an additional screen for setting up a new profile according to various embodiments of the invention.

Figure 13:
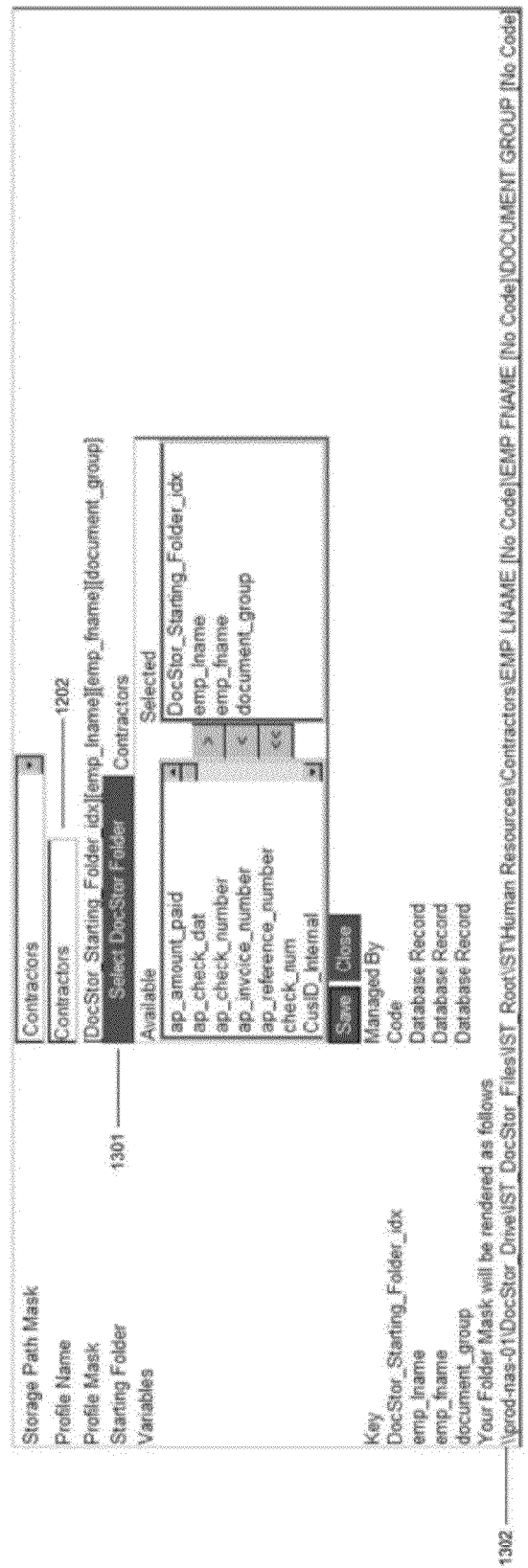

FIG. 13 illustrates a screen for configuring a folder mask according to various embodiments of the invention.

Figure 14:
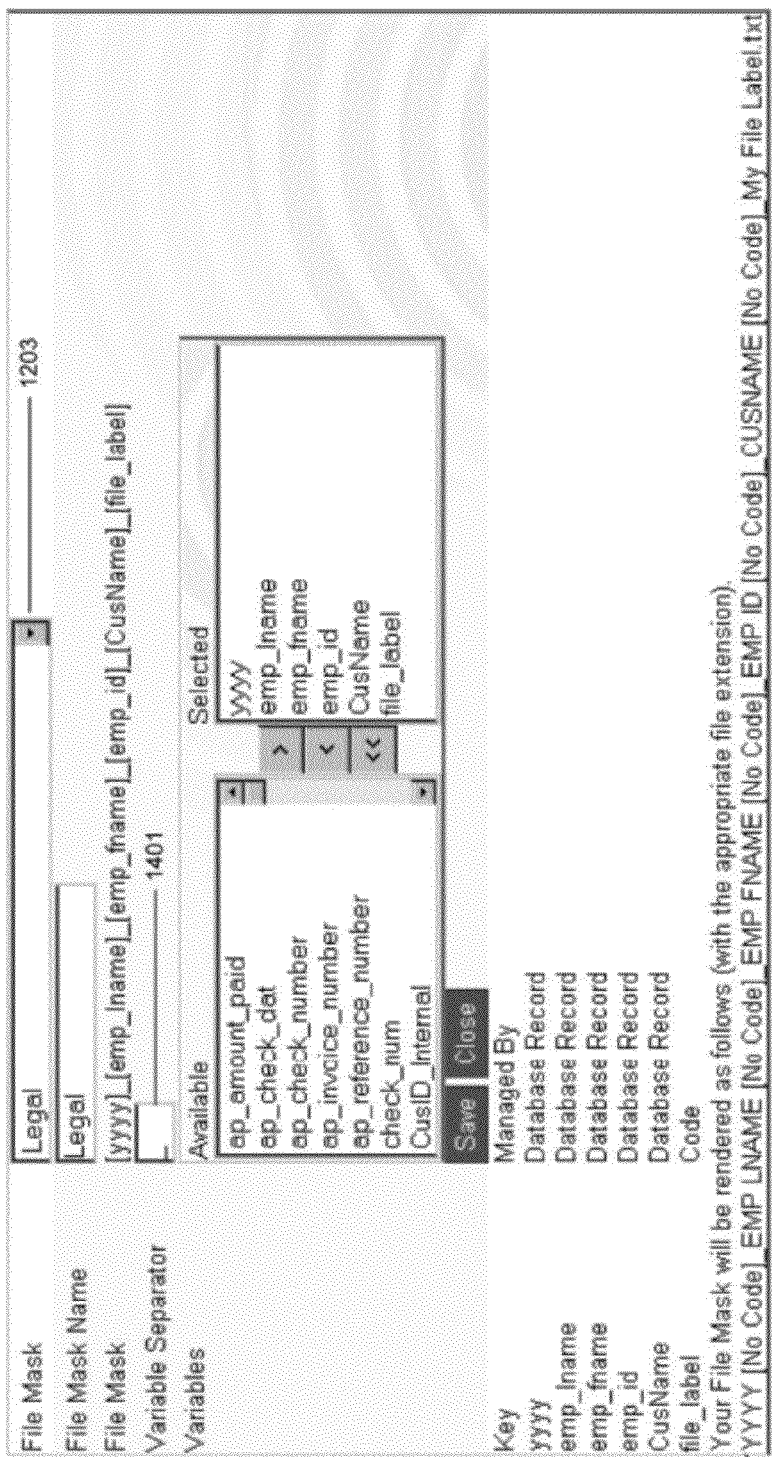

FIG. 14 illustrates a screen for configuring a file mask according to various embodiments of the invention.

Figure 15:
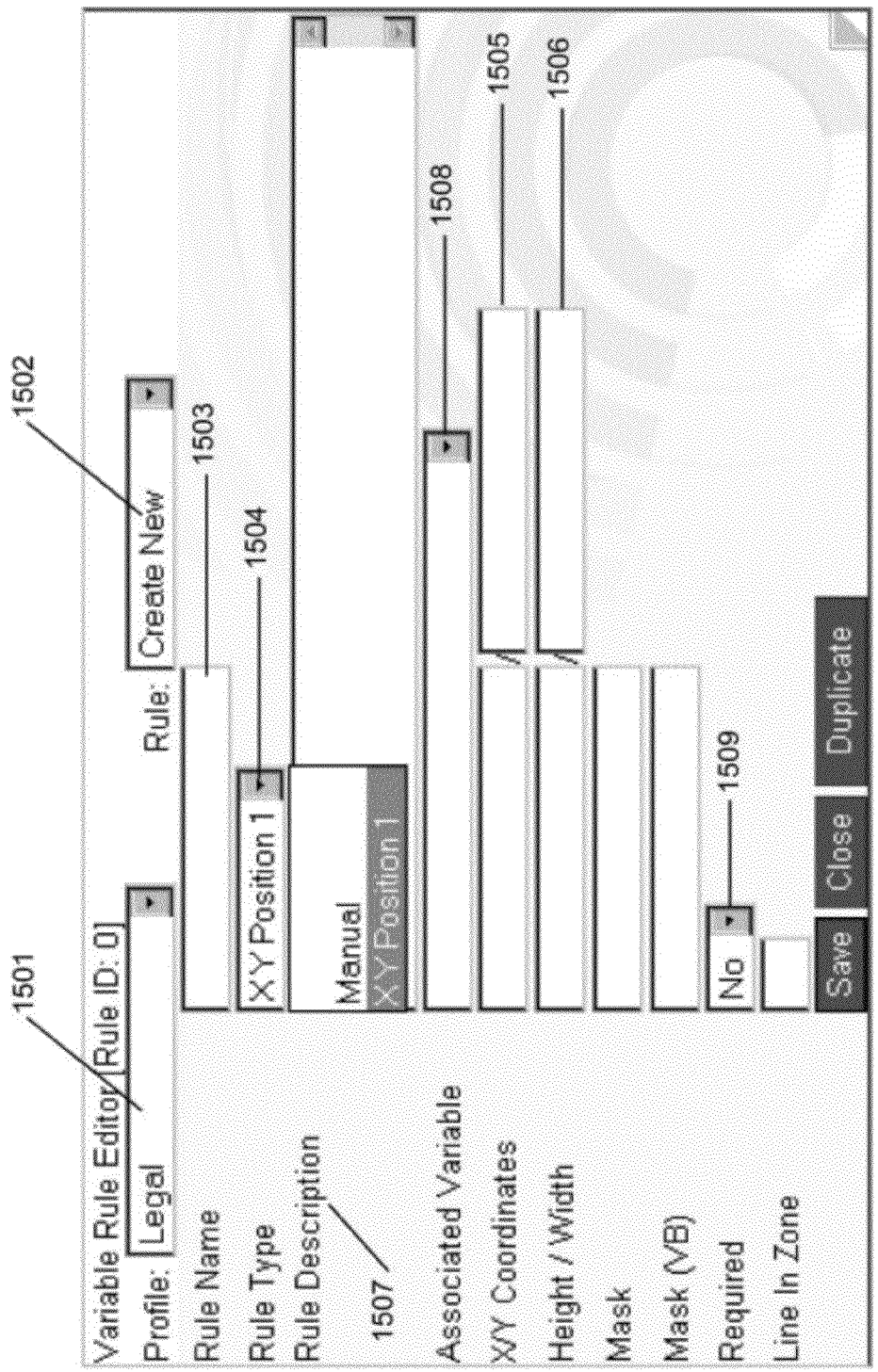

FIG. 15 illustrates a variable rules editor screen according to various embodiments of the invention.

Figure 16A:
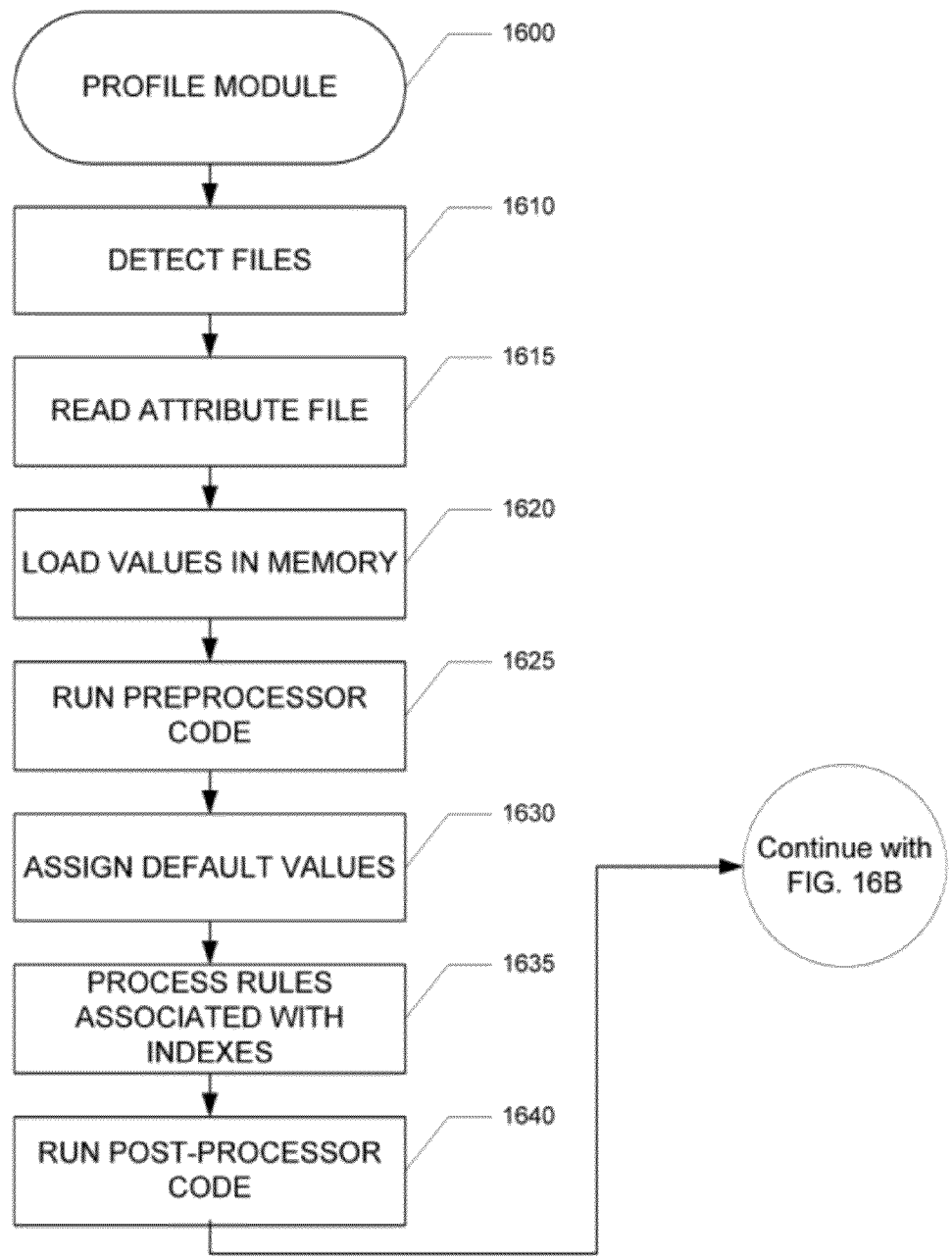

FIG. 16A illustrates a flow diagram of a profile module according to various embodiments of the invention.

Figure 16B:
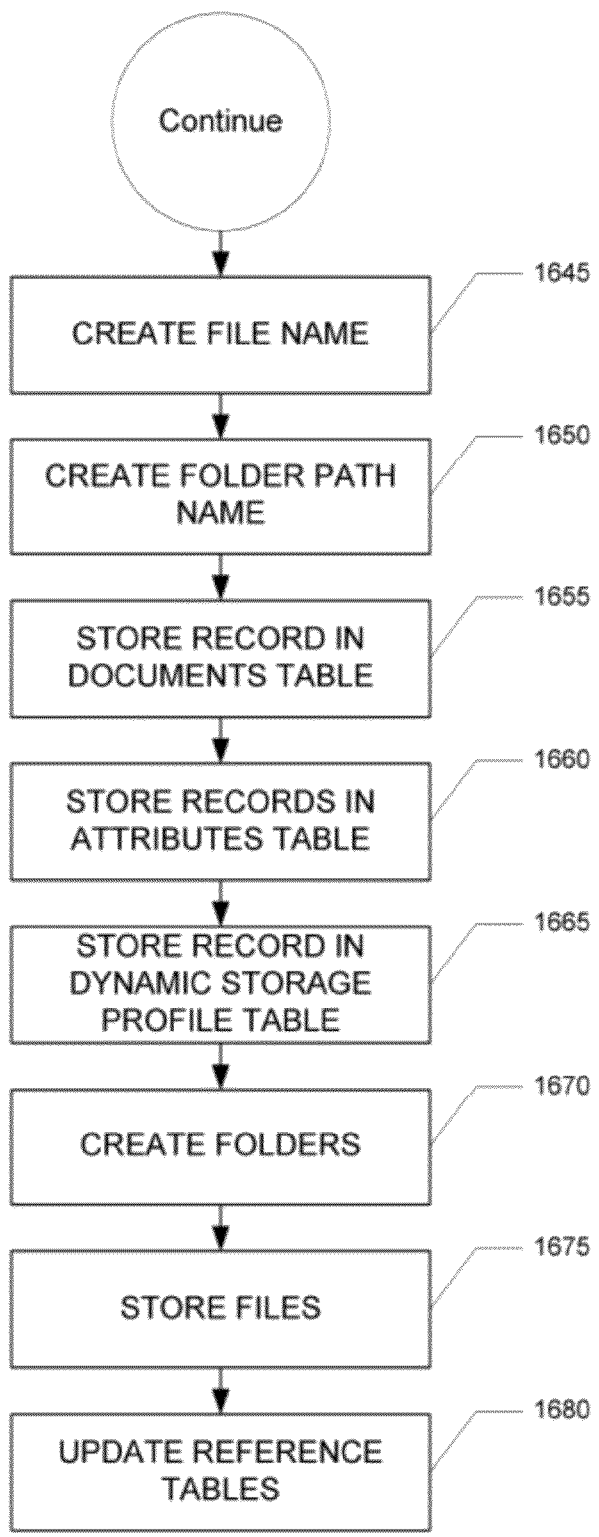

FIG. 16B illustrates a continuation of the flow diagram of a profile module illustrated in FIG. 16A.

Figure 16C:
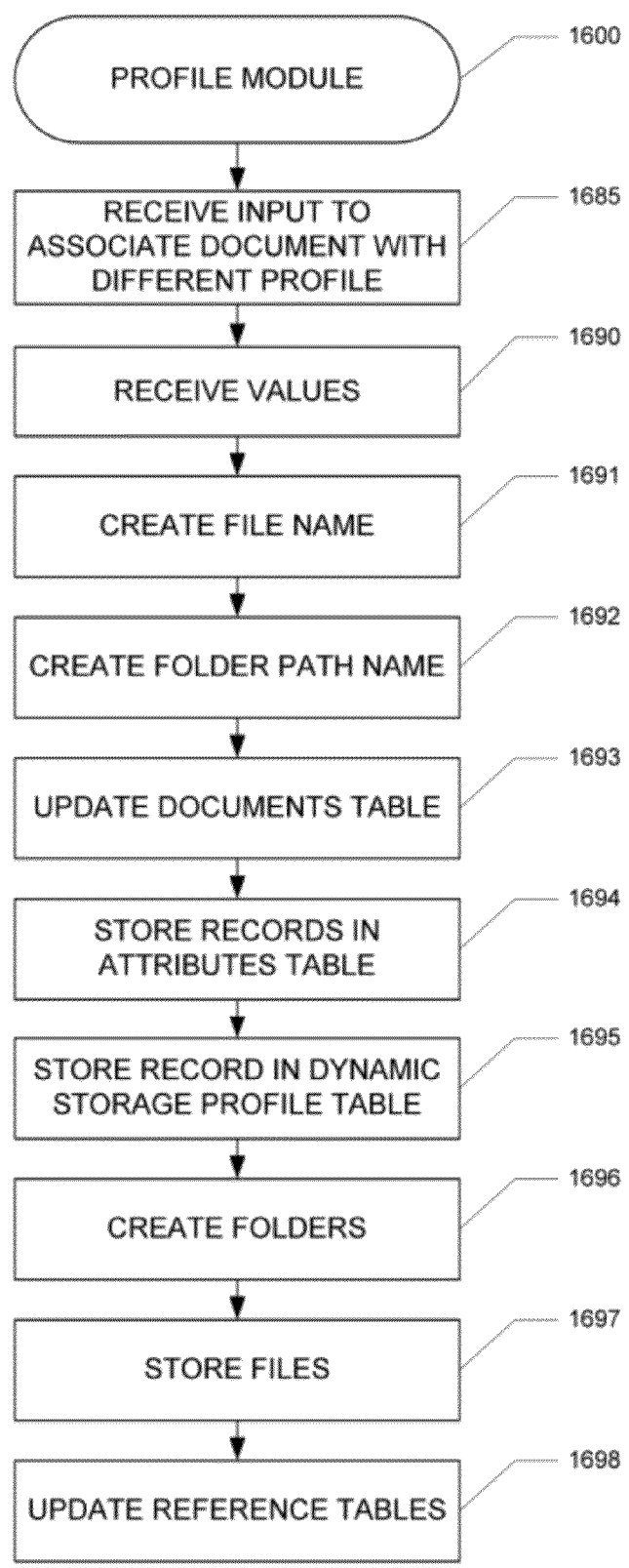

FIG. 16C illustrates an additional flow diagram of a profile module according to various embodiments of the invention.

Figure 17:
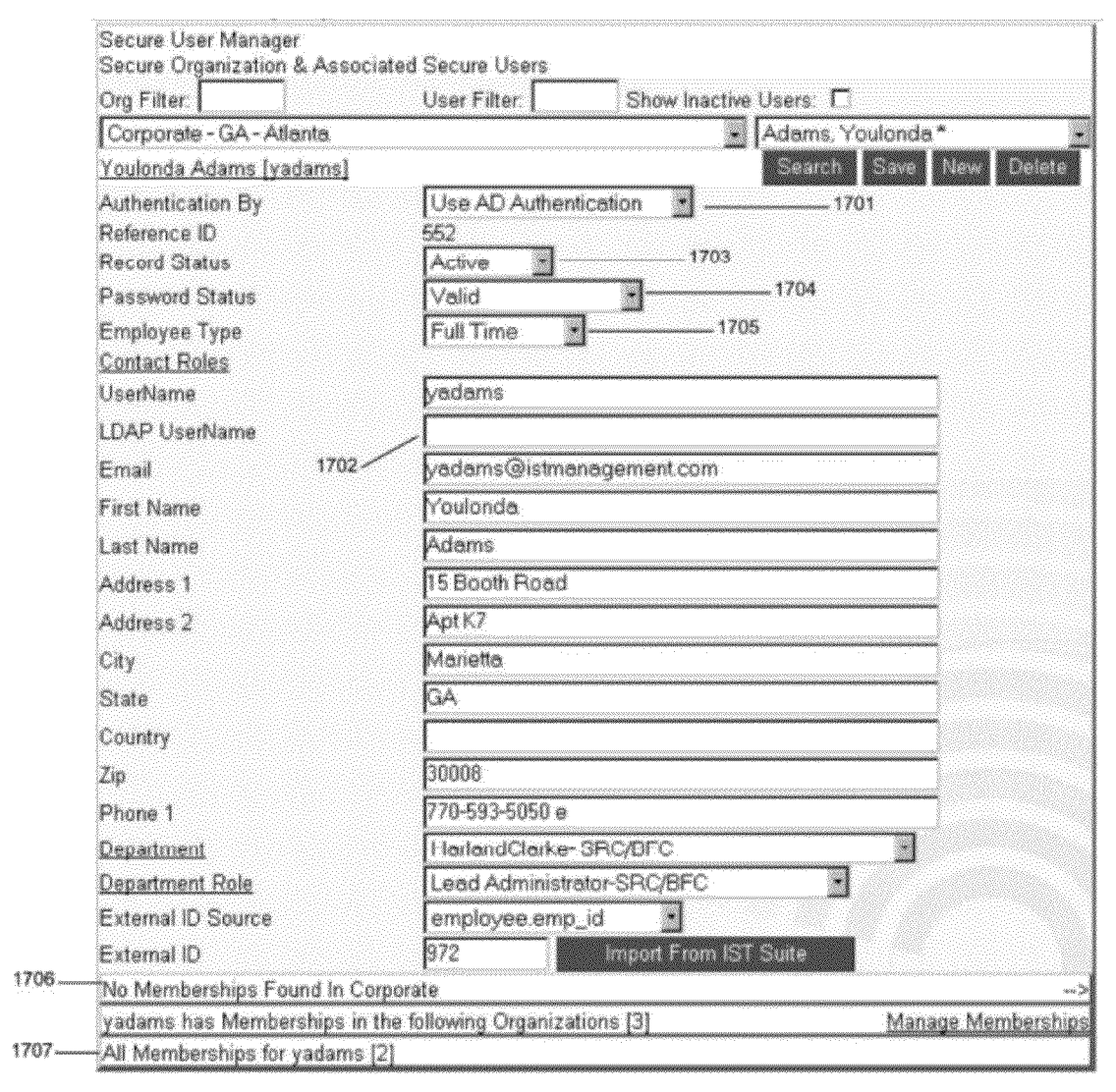

FIG. 17 illustrates a user edit screen according to various embodiments of the invention.

Figure 18:
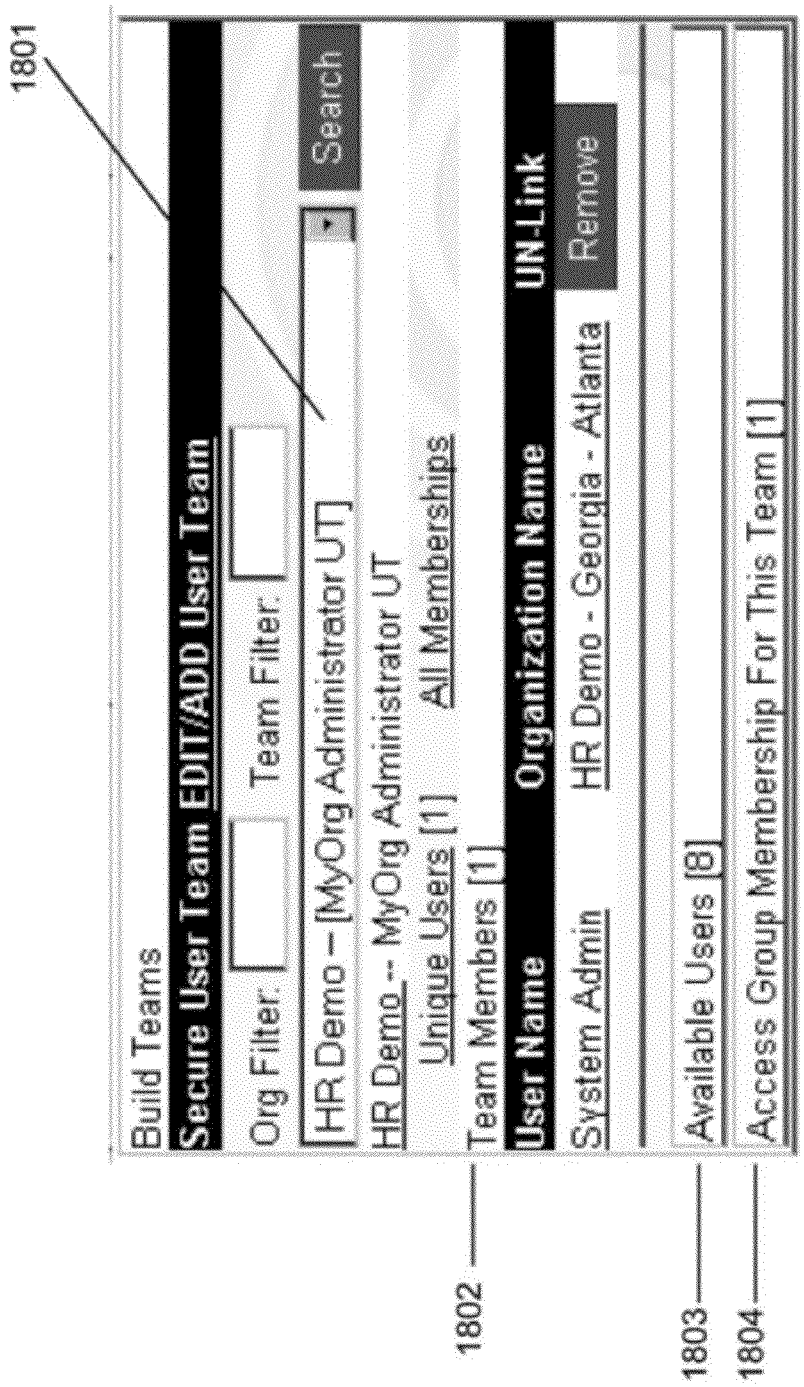

FIG. 18 illustrates a team management screen according to various embodiments of the invention.

FIG. 19 illustrates a group management screen according to various embodiments of the invention.

Figure 20:
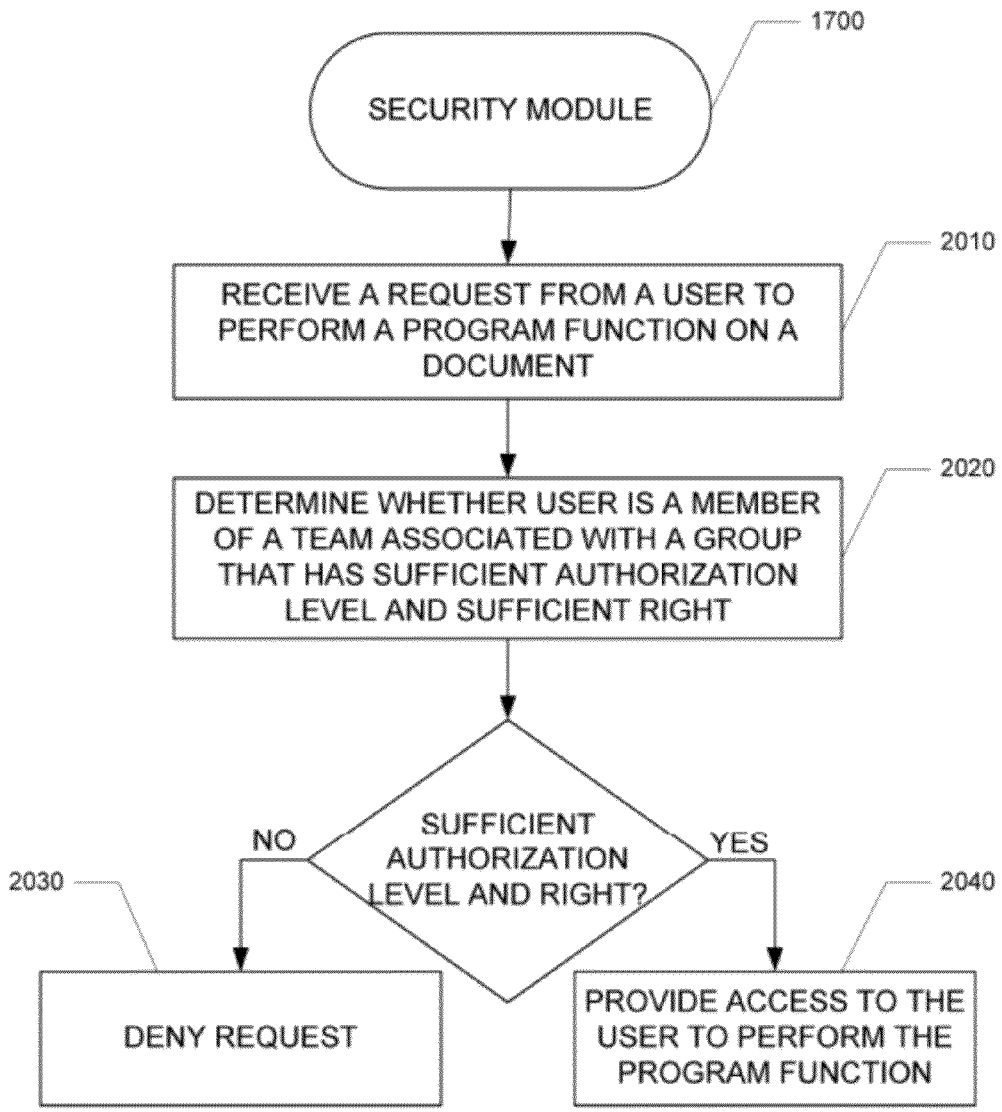

FIG. 20 illustrates a flow diagram of a security module according to various embodiments of the invention.

Figure 21:
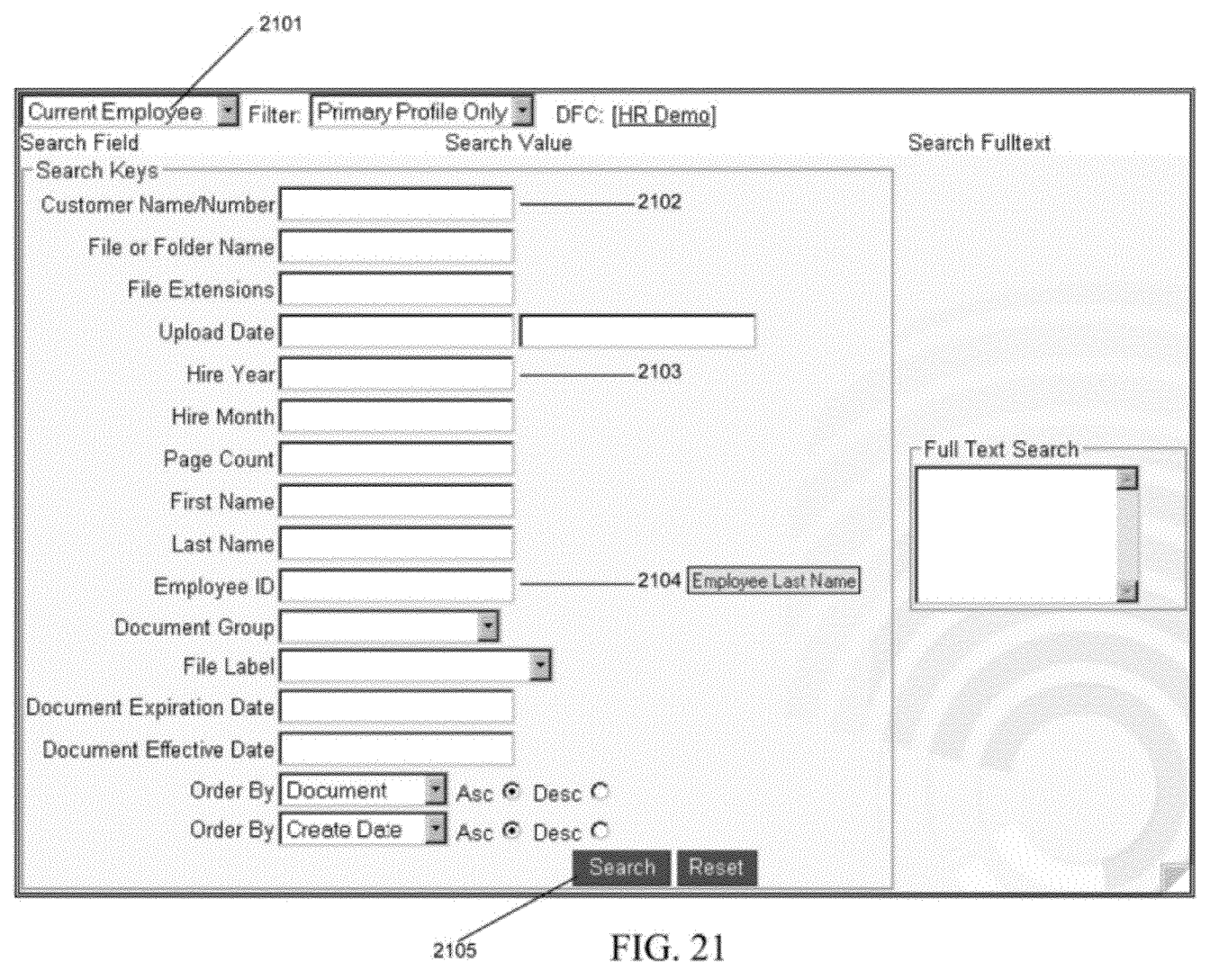

FIG. 21 illustrates a screen for searching documents according to various embodiments of the invention.

Figure 22:
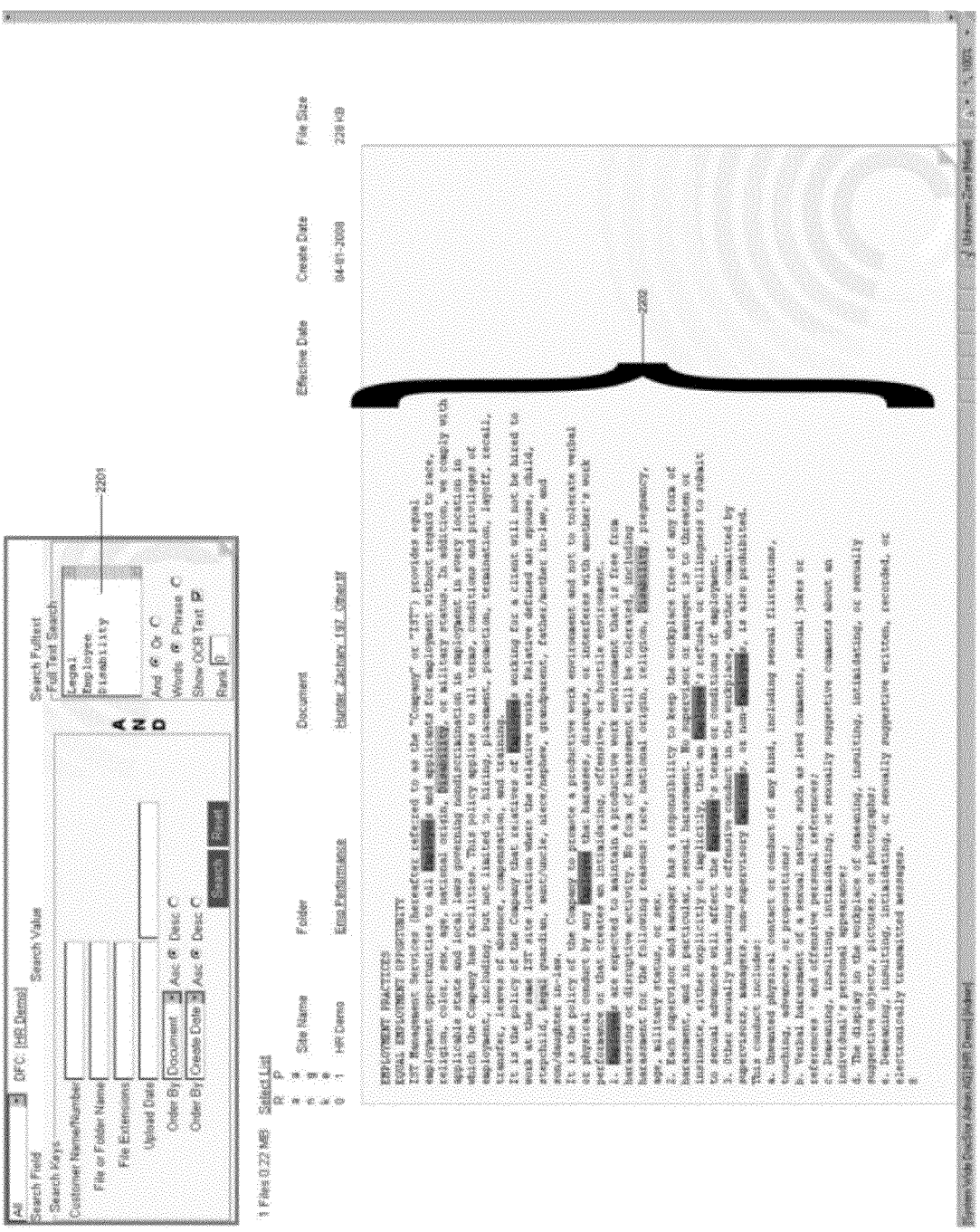

FIG. 22 illustrates a screen for performing full text searches according to various embodiments of the invention.

Figure 23:
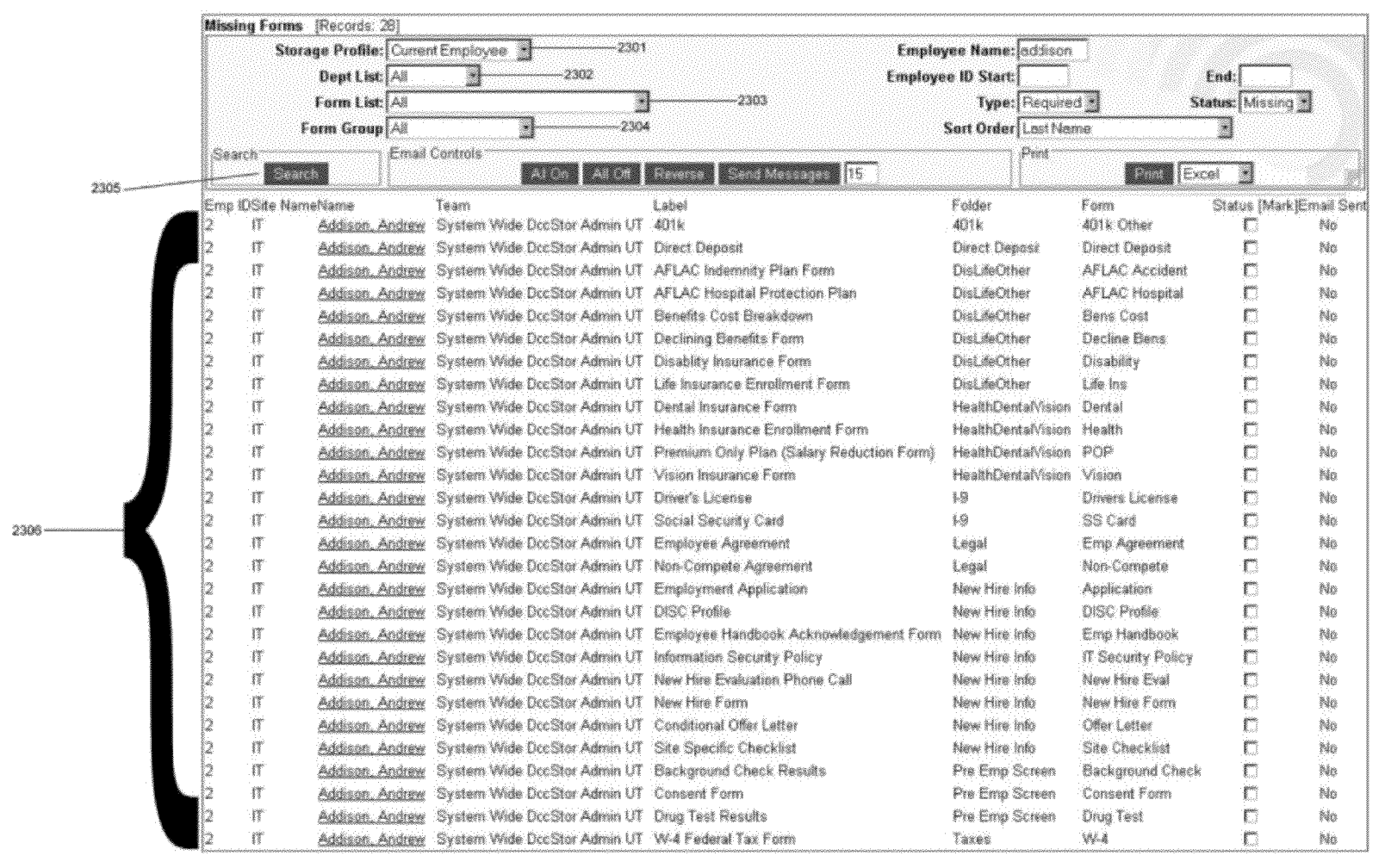

FIG. 23 illustrates a missing forms reporting screen according to various embodiments of the invention.

DETAILED DESCRIPTION OF VARIOUS EMBODIMENTS OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Like numbers refer to like elements throughout.

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Brief Overview

Various embodiments of the present invention provide systems and methods for storing a plurality of electronic documents. For instance, in one embodiment, a user utilizes a workstation and scans in a document to upload into a document management system. In various embodiments, the document management system is configured to store and manage the electronic documents.

As is described in further detail below, the user scans the document into the workstation based on one or more parameters set by the user. In various embodiments, the parameters include a profile that indicates what type of document is being scanned. Furthermore, the profile includes one or more attributes that define the document. These attributes represent distinct information (e.g., values) gathered from the document. For instance, a profile may define an attribute as the last name of the individual associated with the document. Therefore, the distinct information (e.g., value) for the attribute is the actual last name of the individual.

In various embodiments, the workstation is configured to perform optical character recognition (OCR) on the scanned document to recognize patterns and identify characters within the document. Thus, in various embodiments, the workstation uses OCR to gather the values for one or more of the attributes.

In addition, in various embodiments, the workstation uploads the scanned document to the document management system. In various embodiments, the workstation further provides levels of automation for uploading the documents into the system. For instance, in one embodiment, the workstation determines whether the profile associated with the document has been correctly identified for the document. Thus, in this particular embodiment, a confidence level associated with the identified profile is defined that serves as a threshold that must be reached or exceeded in order for the workstation to automatically upload the document into the system. This confidence level may be established based on any of a number of parameters according to various embodiments.

For example, in one embodiment, the confidence level is based on the number of attributes identified in the scanned document. Thus, the workstation may require that one or more particular attributes associated with the identified profile be recognized (e.g., gathered and validated) in the scanned document to be confident that the identified profile is the correct profile for the scanned document. In particular embodiments, the workstation automatically uploads the document into the document management system in response to the confidence level associated with the identified profile meeting or exceeding a predetermined confidence level threshold,.

Furthermore, in various embodiments, the document management system stores the uploaded document in the system based on the identified profile. For instance, in various embodiments, the system may store the uploaded document in the system along with one or more records in one or more tables of a database. In various embodiments these records are used to manage the storage of the document in the system and to help locate the document in the system once the document is stored in the system.

For example, in various embodiments, a record is stored in a documents table for the uploaded document. In particular embodiments, the record stored in the documents table includes a document identifier, a location identifier identifying the location of the document in the system, and a profile identifier identifying the current active profile and an associated dynamic storage profile table. In further embodiments, one or more records are stored in an attributes table for the uploaded document. In these particular embodiments, each record is stored for a particular attributed defined in the identified profile for the uploaded document and includes the document identifier, the profile identifier, and an attribute identifier that identifies the particular attribute. In various embodiments, a record is also stored in the identified dynamic storage profile table. The dynamic storage profile table includes a field for each attribute stored in the attributes table for the uploaded document and the record stored in the table includes the document identifier and the value identified for each attribute in the corresponding field of the table.

In addition, in various embodiments, the system automatically generates one or more folders for storing the uploaded document. These folders are based on a folder mask defined in the identified profile. Specifically, the folder mask provides the naming convention and hierarchy for folders constructed in the system to store the uploaded document. In various embodiments, the naming convention and hierarchy are based on one or more of the attributes. Thus, the system automatically builds out the directory structure for the uploaded document using the identified attributes in the folder mask.

In addition, in various embodiments, the identified profile also provides a file mask that defines the format to use when storing the document in a folder in the directory structure. In various embodiments, the file mask identifies one or more of the attributes to use to "rename" the uploaded document. Thus, the system automatically renames the document based on the file mask before storing the document in the directory structure.

As a result of using profiles and associated folder and file masks to upload and store documents in the document management system, the documents are stored in the system based on standardized directory structures and standardized naming conventions. Thus, the documents are stored in the system in a consistent manner and are easier to manage, search, and locate within the system in various embodiments.

Further embodiments of the document management system provide robust security for the documents stored in the system. In various embodiments of the system, users are made members of teams and teams are made members of groups. Groups are assigned with rights to perform various functions on documents such as edit, copy, or delete documents in the system. Thus, these rights are imputed to the teams that are members of the particular group, and likewise imputed to the users who are members of the particular teams.

Furthermore, in various embodiments, the system assigns individual groups an authorization level. For example, in one embodiment, the system assigns each group a particular numeric authorization level within a particular range of values (e.g., between 000 and 200). In addition, in various embodiments, the system assigns each folder and/or document stored in the system a level of authorization that must be met or exceeded in order to access the documents and/or folders. Therefore, in the current example, each of the system's folders and/or files is assigned a level of required authorization between 000 and 200. As a result, a user is prohibited from performing a function on a document in the system unless the user is a member of a team that is a member of a group with the proper authorization level (e.g., an authorization level greater than or equal to the level of required authorization for the document) and proper assigned right.

For example, a user may request to perform a function, such as copy, on a document in the system. The system receives the request from the user and determines whether the user has the appropriate authorization level and the appropriate right to perform the function on documents within the folder where the document is stored. Thus, the system validates that the user is a member of a team that is a member of a group that has the right to copy a document. In addition, the system validates that the group has an authorization level greater than or equal to the level of required authorization for the document. For instance, the group may be assigned an authorization level of 150 and the document may be assigned an authorization of 100. If the system determines the group, and thus the corresponding user, has the appropriate authorization level (e.g., 150 is greater than 100), the system provides access to the user to perform the requested function on the document. In this case, the system allows the user to copy the document.

System Architecture

A document management system 1 according to various embodiments of the invention is shown in FIG. 1. As may be understood from this figure, in various embodiments, the system 1 includes an input device 100 configured for inputting documents into the system 1. For example, in one embodiment, the input device 100 is a scanner that an operator uses to scan documents into the system 1. In another embodiment, the input device 100 is a computing device that is used to upload an electronic document into the system 1. For example, an operator may upload a word processing document directly into system 1. In various embodiments, one or more input devices 100 may be used in conjunction with components within the system 1 to upload documents. For example, the one or more devices 100 (e.g., workstation) may be stand-alone computers that are operatively connected to one or more document scanners.

In addition, the system 1, as depicted in FIG. 1, also includes a document management server 110, a storage medium 120, and a database 140 that are connected via a network 130 (e.g., a LAN, the Internet, a wireless network, and/or a private network) with the workstation 100 and communicate with one another. In various embodiments, the document management server 110 is configured for managing several aspects associated with storing the electronic documents, such as document filing, retrieving, and securing. In various embodiments, the storage medium 120 is configured to store the electronic documents.

In various embodiments, the database 140 is used to store information to manage the system 1. Thus, in various embodiments, the database 140 contains one or more tables that include information about the documents stored in the system 1. This information is utilized by the document management server 110 for several purposes. For example, the document management server 110 may utilize the information stored in the database 140 for locating documents stored in the system 1. Furthermore, the database 140 in various embodiments may be of various types of databases such as Oracle® or SQL Server® and may include a database management application.

In addition, in various embodiments, the workstation 100 and/or document management server 110 may be one or more computers or software programs running on one or more computers. Furthermore, in various embodiments, the storage medium 120 may be one or more types of medium such as hard disks, magnetic tapes, or flash memory.

FIG. 2 shows a schematic diagram of an input device 100 according to one embodiment of the invention. In this particular embodiment, the device 100 is a computing device such as a workstation. The workstation 100 includes a processor 60 that communicates with other elements within the workstation 100 via a system interface or bus 61. Also included in the workstation 100 is a display device/input device 64 for receiving and displaying data. This display device/input device 64 may be, for example, a keyboard or pointing device that is used in combination with a monitor. The workstation 100 further includes memory 66, which preferably includes both read only memory (ROM) 65 and random access memory (RAM) 67. The server's ROM 65 is used to store a basic input/output system 26 (BIOS), containing the basic routines that help to transfer information between elements within the workstation 100. Alternatively, the workstation 100 can operate on one computer or on multiple computers that are networked together.

In addition, the workstation 100 includes at least one storage device 63, such as a hard disk drive, a floppy disk drive, a CD Rom drive, flash drive, or optical disk drive, for storing information on various computer-readable media, such as a hard disk, a removable magnetic disk, or a CD-ROM disk. As will be appreciated by one of ordinary skill in the art, each of these storage devices 63 is connected to the workstation bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. For example, as shown in FIG. 2, program modules of the workstation 100 may include an operating system 80, a scan module 400, an OCR module 600, and an upload module 700. These modules 400, 600, 700 may be used to control certain aspects of the operation of the workstation 100, as is described in greater detail below, with the assistance of the processor 60 and an operating system 80.

Also located within the workstation 100 is a network interface 74, for interfacing and communicating with other elements of a computer network. It will be appreciated by one of ordinary skill in the art that one or more of the workstation's 100 components may be located geographically remotely from other workstation 100 components. Furthermore, one or more of the components may be combined, and additional components performing functions described herein may be included in the system 1.

In addition, FIG. 3 shows a schematic diagram of a document management server 110 according to one embodiment of the invention. The document management server 110 includes a processor 360 that communicates with other elements within the document management server 110 via a system interface or bus 361. Also included in the server 110 is a display device/input device 364 for receiving and displaying data. This display device/input device 364 may be, for example, a keyboard or pointing device that is used in combination with a monitor. The server 110 further includes memory 366, which preferably includes both read only memory (ROM) 365 and random access memory (RAM) 367. The server's ROM 365 is used to store a basic input/output system 26 (BIOS), containing the basic routines that help to transfer information between elements within the server 110. Alternatively, the document management server 110 can operate on one computer or on multiple computers that are networked together.

Furthermore, the server 110 includes at least one storage device 363, such as a hard disk drive, a floppy disk drive, a CD Rom drive, flash drive, or optical disk drive, for storing information on various computer-readable media, such as a hard disk, a removable magnetic disk, or a CD-ROM disk. As will be appreciated by one of ordinary skill in the art, each of these storage devices 363 is connected to the server bus 361 by an appropriate interface. The storage devices 363 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 367. For example, as shown in FIG. 3, program modules of the server 110 may include an operating system 380, a profile module 1000, a security module 1700, a search module 2100, and a reporting module 2300. These modules 1000, 1700, 2100, 2300 may be used to control certain aspects of the operation of the document management server 110, as is described in greater detail below, with the assistance of the processor 360 and an operating system 380.

Also located within the server 110 is a network interface 374, for interfacing and communicating with other elements of a computer network. It will be appreciated by one of ordinary skill in the art that one or more of the server's 110 components may be located geographically remotely from other server 110 components. Furthermore, one or more of the components may be combined, and additional components performing functions described herein may be included in the system 1.

Exemplary System Operation

As mentioned above, a system 1 according to various embodiments enables the storage and management of electronic documents. In particular, in various embodiments, the system 1 includes one or more input devices 100. For example, the input device 100 may include a workstation that is configured to manage the upload of documents into the system 1. As previously described, in various embodiments, the workstation 100 may include a scan module 400, an OCR module 600, and an upload module 700. The scan module 400 is configured to scan and save documents based on parameters set by, for example, the user of the workstation 100. In other embodiments, the parameters may be set by another individual or automatically by the system. The OCR module 600 is configured to perform optical character recognition on the scanned documents. The upload module 700 is configured to upload electronic documents into the system 1.

Furthermore, in various embodiments, the system 1 includes a document management server 110. In various embodiments, this server 110 includes a profile module 1000, a security module 1700, a search module 2100, and a reporting module 2300. The profile module 1000 is configured for use by a user of the system 1 to construct profiles employed to establish standards for collecting data and to provide the mechanisms for capturing the data. The security module 1700 is configured to establish access rights for users by utilizing groups and teams. The search module 2100 is configured to search for electronic documents using the constructed profiles. The reporting module 2300 is configured to provide several reports based on the stored documents. These modules 400, 600, 700, 1000, 1700, 2100, 2300 are described in more detail below.

Scan Module

FIG. 4 illustrates a flow diagram of the scan module 400 according to various embodiments. This flow diagram may correspond to the steps carried out by the processor 60 in the workstation 100 shown in FIG. 2 as it executes the scan module 400 in the workstation's RAM memory 67 according to various embodiments.

According to various embodiments, the scan module 400 is used to retrieve document information for processing by the system. That is, in various embodiments, the scan module 400 is used to acquire documents to upload into the document management system 1. Thus, in Step 410, the scan module 400 detects one or more configuration parameters set, for example, by the user of the workstation 100 or other individual. In various embodiments, these configuration parameters indicate how the document should be processed. For instance, in one embodiment, the user sets a parameter to indicate what type of document is being scanned. Thus, in Step 420, the scan module 400 scans the document based on the set parameters.

In various embodiments, the scan module 400 calls an OCR module 600 to perform optical character recognition (OCR) data collection on the scanned document, shown as Step 430. Furthermore, in various embodiments, the scan module 400 makes use of a profile, shown as Step 440. As will be described in further detail below, the user may construct one or more profiles in the system 1. These profiles are used by the system 1 as indicators of what types of documents are being uploaded into the system 1 and are used to manage several aspects of the system 1. In particular embodiments, the profile selected for the particular document provides locations (e.g., rules) of information on the document that is read via OCR.

In Step 450, the scan module 400 inserts the scanned document into an upload queue. Thus, in various embodiments, the document remains in the queue until the document is loaded into the system 1 or until user intervention removes the document from the queue. In addition, in various embodiments, the scan module 400 also saves a copy of the document locally for a predetermined time period, shown as Step 460. For instance, in one embodiment, the module 400 stores the document on the storage device 63 of the workstation 100 until (also after) the document is uploaded into the document management system 1. Finally, in Step 470, the scan module 400 calls the upload module 700 to upload the document into system 1.

FIG. 5 illustrates a display screen, according to one embodiment, that is adapted to allow a user to enter configuration parameters for the scan module 400. For instance, in various embodiments, the configuration parameters may include a setting that allows a user to insert scanned pages into an unsaved document. Thus, as shown in FIG. 5, the user indicates on the display screen where in the unsaved document the scanned document should be inserted. The user selects the "Before Current Page" button 501 on the screen and the newly scanned page(s) are inserted before the currently displayed page 502 at the bottom of the screen. The user may also select the "After Current Page" button 503 to insert the newly scanned page(s) after the currently displayed page 502. Thus, when the scan module 400 scans the new pages placed on the scanner, the module 400 inserts the newly scanned documents into the unsaved document as indicated by the user.

Furthermore, the user may also select other configuration parameters on the display screen shown in FIG. 5. For instance, the user may set the Load Type 504 on the screen to indicate what type of document is being uploaded to the system 1. For example, the user may select the type "One Profile-One Doc" to indicate that the user is only scanning a single document. The user may select the type "One Profile-Multi-Doc" to indicate that the user is scanning multiple documents of a single type. For example, the user may be scanning several human resource documents for new employees. Furthermore, the user may select the type "Multi Profile-Multi Doc" to indicate that the user is scanning multiple documents of different types.

In addition, the user may also select the "Profile" 505 on the screen to indicate the type of document(s) being scanned into the system 1. Thus, as a result of the user selecting a profile on the display screen, the system 1 can process the scanned documents more quickly. Furthermore, various embodiments of the scan module 400 include an "Auto Sense" profile to indicate to the system 1 to determine the type of document for the user.

In various embodiments, each profile with OCR settings effectively has a "template with boxes", like an overlay, and each box expects a certain type of information to be found there. In these particular embodiments, the profiles are sorted from most specific and highest required confidence to least specific and lowest required confidence. The scan module 400 uses the "overlay" to grab information from the document page and compares the information with what is expected for a particular profile using a regular expression. For example, the scan module 400 determines whether the information is a four-digit number or three alpha characters, a dash, and then a six-digit number. If the information constraints and quantity of fields match with the template for the particular profile, then the scan module 400 determines the profile is appropriate for the document. Additionally, in various embodiments, the scan module may also need to match one of the zones to a specific value, such as "Form 1040".

Further configuration parameters that may also be indicated by the user according to various embodiments include: (1) document editing buttons (e.g., "Clear" and "Remove" buttons 506) to manipulate the currently displayed document 502 at the bottom of the screen; (2) a "Refresh" button 507 to refresh the cached profile settings; (3) a "Browse" button 508 to add documents already scanned and saved; (4) a "Keep Cover" button 509 to indicate to the scan module 400 to keep the cover page of a scanned document; (5) document browsing buttons 510 to browse through the pages of the currently display document 502; and (6) the scanner settings (e.g., "Document Feeder" and "Duplex" buttons 511) to select the document feeder for scanning and to scan both sides of a document. Once the user has set the configuration parameters as desired, the user selects the "Scan" button 512 to initiate a scan job, e.g., to initiate the module 400 to scan the paper copy of the document. Furthermore, the user selects the "Save" button 513 to save the scan job, e.g., to have the module 400 save the scanned document into the system 1.

In addition, to scanning documents to upload into the system 1, various embodiments of the workstation 100 are also configured to allow a user to download an electronic document located on the workstation 100 or on another computing device in communication with the workstation 100 over the network 130. For example, the workstation 100 of various embodiments provides a drop down selector similar to Microsoft® Explorer® that allows the user to navigate the storage on the workstation 100 and/or the network 130, select a particular document, and download the document into the workstation 100 to be uploaded into the system 1. Furthermore, various embodiments include a Web page that interfaces with the document management server 110 of the system and allows the user to upload documents into the system 1 directly using the Web page.

Optical Character Recognition Module

FIG. 6 illustrates a flow diagram of the optical character recognition (OCR) module 600 according to various embodiments. This flow diagram may correspond to the steps carried out by the processor 60 in the workstation 100 shown in FIG. 2 as it executes the OCR module 600 in the workstation's RAM memory 67 according to various embodiments.

As described above, in various embodiments, the scan module 400 calls the OCR module 600 to perform OCR on scanned documents. Thus, in Step 610, the OCR module 600 determines the OCR settings for the particular document. In various embodiments, this entails the OCR module 600 gathering information from the profile selected for the document. For instance, in particular embodiments, the profile includes rules that provide details to capture information from the document using OCR. For example, the rules may divide the document into one or more zones and provide X and Y coordinates of characters in these particular zones. Furthermore, the rules may require certain information about the document be entered at this time.

In Step 620, the OCR module 600 performs OCR on the document according to the rules. Thus, the module 600 is configured to recognize patterns and identify characters within the scanned document based on the rules. In various embodiments, if zones are defined, the OCR module 600 interprets the characters within the zones, shown as Step 630. Thus, the OCR module 600 reads in the pixels in a particular zone and attempts an OCR conversion to render text for processing. Furthermore, in various embodiments, the OCR module 600 validates the zonal data based on validation codes, shown as Step 640. That is, in various embodiments, the OCR module 600 compares the data via regular expressions configured in the rules.

As will be described in further detail below, the system 1 of various embodiments uses the identified characters as attributes for multiple functions within the system 1. Therefore, in Step 650, the OCR module 600 updates these attributes based on the identified characters. Finally, in various embodiments, the OCR module 600 exports the identified characters (e.g., text) to a file, shown as Step 660. This file may then be uploaded into the system 1 for storage and use.

Upload Module

FIG. 7 illustrates a flow diagram of the upload module 700 according to various embodiments. This flow diagram may correspond to the steps carried out by the processor 60 in the workstation 100 shown in FIG. 2 as it executes the upload module 700 in the workstation's 100 RAM memory 67 according to various embodiments.

In general, the upload module 700 of various embodiments is configured to upload electronic documents into the document management system 1. For instance, the upload module 700 uploads the electronic documents to the document management server 110, and the server 110 saves the documents to the storage medium 120 of the system 1.

Thus, in Step 710, the upload module 700 receives an electronic document. For example, the electronic document may be an individual's tax form. In various embodiments, the upload module 700 is tied to the profiles of the system 1 to provide one or more levels of automation for uploading documents into the system 1. For instance, in one embodiment, the upload module 700 provides three levels of automation. The first level of automation is associated with highly structured documents. Under this level of automation, the upload module 700 reads the OCR data fields that were identified on the first page of the scanned document and routes the document into a profile based on the OCR data fields.

The second level of automation is associated with less structured documents. Under this level of automation, the user instructs the scan module 400 to split a set of newly scanned documents every certain number of pages. For example, the scanned documents may include several employees' pay stub forms and the user may indicate to the scan module 400 to split the scanned documents every predetermined number of pages (e.g., every five pages because a single pay stub form is five pages).

The third level of automation is associated with even less structured documents. Under this level of automation, the user edits the set of scanned documents via the scan module 400 and manually splits the documents into the individual documents and assigns needed attributes (e.g., enters values for attributes) to the documents.

Thus, in various embodiments, the upload module 700 determines which profile to use with regard to a particular scanned electronic document and identifies the values in the document associated with one or more attributes defined in the profile, shown as Step 720. For instance, the upload module 700 may determine that an employee record profile should be used to upload an employee document into the system 1. The employee record profile may, for example, include the following attributes: (1) last name; (2) first name; and (3) employee number. As a result, the upload module 700 identifies the value in the document (e.g., attribute file) for each attribute, such as, for example, "Smith" for last name, "Mark" for first name, and "1234" for employee number.

Depending on the level of automation, in various embodiments, the user may indicate which profile to use for the document. For example, the user can indicate on the scan module's 400 display screen shown in FIG. 5 what profile 505 to use for the document. In other embodiments, the upload module 700 automatically determines the profile for the electronic document and automatically uploads the document based on attributes defined in the identified profile. For instance, the user sets the profile to "Auto Sense" on the display screen and scans one or more documents to upload into the system 1. In turn, the OCR module 600 identifies a number of characters within the document(s) to use as attributes for the document(s). The user then selects the "Save" button on the scan module's 400 display screen and the upload module 700 detects that the profile 505 on the screen has been set to "Auto Sense." Accordingly, the upload module 700 attempts to determine what is the appropriate profile for the document(s) to use to upload the document(s) into the document management system 1.

Furthermore, in various embodiments, the user can set a confidence level that the upload module 700 uses to determine whether to upload a document based on a probability that the upload module 700 (or user) has identified the correct profile for the document. For instance, the user may identify one or more attributes (e.g., indexes) for a particular profile and indicate that one or more of these attributes must be identified on a document in order to use the particular profile to upload the document into the system 1. For example, the user may identify four attributes, such as first name, last name, employee identification, and hire date, for a current employee profile and indicate that the document must have at least three of these attributes identified in the document to "qualify" to use the current employee profile to upload the document into the system 1.

Thus, in various embodiments, the upload module 700 processes confidence metrics that gauges whether the correct profile has been identified for uploading the document into the system 1, shown as Step 730. Returning to the example above, the upload module 700 determines whether the module 700 has identified at least three of the four attributes (e.g., first name, last name, employee identification, and hire date).

At Step 740, if the upload module 700 has identified at least three of the attributes in the document, the module 700 proceeds with uploading the document into the system 1, shown as Step 750. For instance, in one embodiment, the upload module 700 uploads the document to the document management server 110 and/or a storage medium in communication with the document management server 110. If the upload 700 has not identified at least three of the attributes in the document, the module 700 awaits for user intervention, shown as Step 760. Thus, in various embodiments, a user may intervene to remedy the situation. For example, the user may select a different profile for the document or the user may provide information for one or more attributes. Once the user has intervened and remedied the situation, the user may instruct the upload module 400 to upload the document to the system 1, shown as Step 770.

In various embodiments, the upload module 700 includes a screen that provides a status of documents as they are processed, as shown in FIG. 8. On the screen, the profile column 801 displays the profile identified by the upload module 700 (or user). A profile of "Unknown" indicates that the upload module 700 was unable to determine what type the document is.

The screen further includes a probability column 802 that displays the probability (e.g., via a percentage) that the upload module 700 (or user) has identified the correct profile (e.g., the profile listed in the profile column 801) for the document. In various embodiments, the user (or the system or other individual) sets the percentage to an acceptable threshold level that must be met or exceeded in order for the upload module 700 to automatically upload the document into the system 1. For instance, the user indicates that the upload module 700 must identify a profile with a probability of 100% of being correct before the upload module 700 uploads the document automatically into the system 1. Thus, in this example, a document that does not have an identified profile at a probability of 100% is placed in an "Error Queue." As a result, the user is required to intervene before the document can be uploaded into the system 1.

The screen further includes an indexes column 803 that displays the number of indexes (e.g., attributes) required for the profiled specified in the profile column 801 and the number of indexes the upload module 700 has identified. For example, the screen displays "3 of 4" in the indexes column 803 for the first occurrence of the profile "Terminated Employee." This indicates that the upload module 700 was able to identify three of the four required indexes for the particular document. In various embodiments, these indexes are used as identifiers for a particular document in the system 1 to help in retrieving the document from the system 1. In the particular embodiment shown in FIG. 8, the probability is determined based on the number of indexes that the upload module 700 has identified.

Furthermore, the screen includes a status column 804 that displays the status of the document being uploaded. For instance, as previously discussed, a document with a status of "Error Queue" indicates that the document has encountered an error while uploading to the system 1. In various embodiments, the user can right click the document to delete the document from being uploaded. In addition, in various embodiments, the user can double click on a document that is in an "Error Queue" to correct the error. For example, FIG. 9 shows a particular screen that is displayed for an embodiment once the user has double clicked on a document in an "Error Queue." The screen displays the document 901 and provides a drop down selector 902 for the user to manually select the proper profile to apply to the document. In addition, the screen list the index fields 903 related to the selected profile and provides a value column 904 so that the user can type in the value for each index. Once the user has entered values for the index fields 903, the user can select the "Save" button 905 on the screen to upload the document into the system 1.

The status "Holding" indicates that the document processed correctly. However, the document processed after it was found to contain an error and the document may still contain the error. Therefore, the user may choose to upload the document or delete the document from uploading. In various embodiments, the user may also right click on the document and merge the document with another document to upload.

The status "Uploading" indicates that the document processed correctly and is being uploaded into the system 1. Further, the status "Uploaded" indicates that the document has been successfully uploaded into the system 1. The status "No Connection" indicates that the upload module 700 is unable to connect to the system 1 (e.g., to the document management server 110 or storage medium 363) and that the upload module 700 will upload the document once the connection has been restored.

As a result of the user setting confidence levels for one or more of profiles, the upload module 700 of various embodiments is able to upload a plurality of electronic documents simultaneously into the system 1, wherein one or more of the documents may be of different types. For example, the user can scan in a number of employee documents that include tax forms for the employees, personal records for the employees, and documents on the employees' work histories. The upload module 700 determines whether the proper profile has been identified for each document based on whether a predetermined number of attributes associated with the particular profile have been identified for the document. If the module 700 identifies a predetermined threshold number of attributes, the module 700 uploads the document into the document management system 1. As will be described in further detail below, the system 1 then stores the document in the system 1 based on the profile. As a result, the user can be confident that the tax forms, personal records, and work histories are stored in the correct locations within the document management system 1.

Thus, in the example described above, the profile used to upload employee tax documents may indicate that the upload module 700 must identify the attributes first name, last name, withheld income, and total income on a document before the employee tax documents profile can be used to upload the document into the system 1. Therefore, the user can be confident that any document uploaded using this particular profile is indeed a tax document and that the document is stored in the correct location within the system 1.

Furthermore, in various embodiments, the workstation 100 creates a plurality of (e.g., three) separate files for each uploaded document. As previously discussed, the first file includes the optical character recognition (OCR) data. This file may be used for various purposes such as a word processing document in various embodiments. The second file includes all of the attributes for the document. For example, the attributes of a document may be first name, last name, residential address, social security number, and employee number. In various embodiments, components of the system 1 may extract these attributes from the file for use within the system 1. For example, the attributes may be used for indexing the document so that it can be searched and retrieved from the system 1. The third file includes an image of the original document, such as a TIFF or JPEG file. Such an image file may be important in a context in which an original copy of the document may be needed, such as in the case where a copy of a signed legal document is required. As a result, these three files in various embodiments provide flexibility to the user in utilizing documents stored in the document management system 1.

Profile Module

According to various embodiments, the document management system 1 includes a profile module 1000 that is configured to allow users to construct profiles employed to establish standards for collecting data and to provide the mechanisms for capturing the data. In various embodiments, the profile module 1000 is driven through a Web interface that the user of the system 1 interacts with. Furthermore, in various embodiments, the documents uploaded into the system 1 from the workstation 100 are received by this module 1000 for further processing.

Typically, users of the system 1 set up profiles. In various embodiments, a user of the system 1 creates a new profile via the Web interface (e.g., profile editor) associated with the profile module 1000. On the screen shown in FIG. 10, the user simply uses their mouse to "hover" over the area under "Profile Name" 1001, left clicks and selects "New Profile" 1101, as shown in FIG. 11. A new window pops up as shown in FIG. 12 that includes a number of elements that the user can define for the new profile. First, the user provides a name 1201 for the new profile. In various embodiments, the user is required to provide a unique name so that the system 1 can distinguish one profile from another. Thus, the system 1 can manage a large number of profiles.

In addition, in various embodiments, the user provides a folder mask 1202. The folder mask 1202 sets the naming convention for folders constructed in the system 1 to store documents and instructs the system 1 where to file the documents (e.g., provides a directory structure). For example, many human resource departments may want all employee documents to be filed by last name, first name, and employee number. Thus, the user will define the folder mask 1202 to indicate these particular attributes are used to establish the naming convention for folders constructed in the system 1 to store employee documents. As a result, the profile module 1000 automatically builds out the a directory structure using an employee's last name, first name, and employee number to store employee documents for the particular employee.

An example of such a mask 1202 is shown on the screen displayed in FIG. 13. In this particular example, the mask 1202 is defined by indicating the document starting folder [DocStor_Starting_Folder_idx], which defines the starting folder (e.g., HR 1301) within the system 1 from where the profile module 1000 builds the folder structure. In addition, the mask 1202 is further defined by indicating the attributes emp folder_subgroup, emp_abel, and document_group to build out the remaining folder structure. The screen also provides an example of the mask 1302 near the bottom of the screen.

Returning to FIG. 12, in various embodiments, the user also provides a file mask 1203. The file mask 1203 instructs the system 1 as to which format to use when filing documents to a folder. Thus, the file mask 1203 instructs the profile module 1000 on how to "rename" a document being stored within the system 1. This allows the nomenclature of the files to stay consistent throughout the entire system 1 for the particular profile.

In various embodiments, the user defines the file mask 1203 by indicating what attributes to use to rename the file. For example, in FIG. 14, the user has defined the file mask 1203 based on the attributes emp_lname, emp_fname, emp_id, emp_label, and file_label. In addition, the user has indicated to use an underscore 1401 to separate attributes used in the file name. An example of the file mask 1402 is provided near the bottom of the screen.

It should be noted that when a user sets up a new profile, in various embodiments, the user is not required to define the attributes that make up the folder mask 1202 and the file mask 1203 each time. Instead, in various embodiments, the user may use previously defined masks 1202, 1203 within the system 1. For example, when human resource departments from several organizations are using the system 1 to store employee documents, the system 1 may have several employee document masks 1202, 1203 pre-defined within the system 1. In this case, any one of the human resource departments may select one or more of these masks 1202, 1203 to use. This can save considerable time for users in setting up new profiles.

Returning to FIG. 12, in addition to the folder and file masks 1202, 1203, the user may also define pre-processor 1204 and/or post-processor 1205 elements according to various embodiments. These elements 1204, 1205 are used to define custom code that is executed prior to processing variables (e.g., pre-processor 1204) and/or after processing variables (e.g., post-processor 1205). For example, the custom code may determine whether any required information for one or more attributes is present before saving the document into the system 1. In addition, the custom code may obtain information from other data sources, build data sets from the addition information, and tie the information to the document. For instance, the custom code may obtain additional customer information from a user's SAP application used to run the user's business to store along with shipping invoices uploaded into the system 1. Furthermore, the custom code may perform other tasks such as obtaining additional information from the document and re-building the attribute file, sending an email, writing out a file to a storage location outside the system 1, or updating a record in an external system. Thus, the pre-processor and post-processor elements 1204, 1205 provide a way in which the user can customize the profile to perform tasks related to documents being uploaded and stored within the system 1.

In addition, in various embodiments, the user may also define a version rule element 1206 for the profile that defines how the system 1 should handle versioning of documents uploaded and stored in the system 1 using the particular profile. For example, in various embodiments, the user may define this element to save only the most current version of a document, to save the most current version of the document in the main folder (e.g., the folder defined via the folder mask 1202) and to save the next five (or other predetermined number of) older versions of the document in a versions folder (or any combination thereof), or to save all versions of the document. As a result, this element 1206 allows the user to customize versioning for various types of documents by defining the versioning rule element 1206 within the profile.

Furthermore, in various embodiments, the user may add OCR rules under the OCR element 1207. In particular embodiments, these rules provide details to capture information from a document using OCR at the time the document is scanned and/or uploaded, as well as to accept and to require certain information be entered at that time. For instance, these rules may be used to extract the values for one or more attributes from the OCR data collected for a document. Specifically, in various embodiments, a rule provides the information to locate the value (e.g., distinct information) for a particular attribute from the OCR data. This may be required in the instance in which an attribute is included in the file mask 1203 so that the value for the attribute can be identified in the OCR data.

In various embodiments, the user opens the variable rules editor shown in FIG. 15 to create a new OCR rule for a profile. The user selects the particular profile from the profile drop down selector 1501 and selects "Create New" from the rule drop down selector 1502 on the screen. In particular embodiments, a rule can only be associated with one profile. In other embodiments, a rule can be associated with multiple profiles.

Next, the user names the rule 1503 and indicates in the rule type 1504 whether the information associated with the rule is a manual input or is OCR detected. If the user has selected OCR detected, the user is required to complete the X/Y Coordinates 1505 and Height/Width information 1506 so that during the OCR scan process, the process knows where to locate the field associated with rule on the document being scanned. Furthermore, the user may provide a brief description of the rule 1507 and the attribute (e.g., variable) 1508 associated with the rule. In particular embodiments, an attribute can only be associated with one rule for a particular profile. In addition, the user may also set the rule as required 1509. Thus, by making the rule required, the information must be manually entered or gathered through the OCR module 600 at the time the document is scanned or uploaded. Once the user has completed the information on the screen, the user selects the "Save" button and the rule is added to the identified profile.

FIGS. 16A, 16B, and 16C illustrate flow diagrams of the profile module 1000 according to various embodiments. These flow diagrams may correspond to the steps carried out by the processor 360 in the server 110 shown in FIG. 3 as it executes the profile module 1000 in the server's 110 RAM memory 367 according to various embodiments.

As previously discussed, in various embodiments, the document is uploaded by the upload module 700 to memory accessible to the profile module 1000. For instance, in one embodiment, the document is uploaded to the storage medium 120 in the document management system 1. The document may be held in a queue within the storage medium 120 (e.g., upload folder) until the profile module 1000 reads the document from the medium 120 to store in the system 1. In another embodiment, the document is simply uploaded to the document management server's memory 366 or storage device 363.

Furthermore, as previously discussed, in various embodiments, a plurality of (e.g., three) separate files are uploaded for each document. For example, in one embodiment, an OCR file, an attribute file, and an image file are uploaded for each document. Therefore, in Step 1610 of FIG. 16A, the profile module 1000 detects these files are in the upload folder. In particular embodiments, the profile module 1000 reads the attribute file to gather information related to the document, shown as Step 1615. In various embodiments, the profile module 1000 may use the attributes for various reasons. For example, the profile module 1000 may use the attributes for looking up additional information related to the document from other sources, such as support data sources housed in the system 1 or external to the system 1. The profile module 1000 may use the attributes to populate queries and/or functions to insert, look up, and/or update information the system 1 related to the document. Furthermore, the profile module 1000 may extract the attributes so that they may be broken down into sub-parts for storage. For example, a date attribute may be provided as "MM/DD/YY" and the scan module 1000 may break the attribute into day, month, and year.

In Step 1620, the profile module 1000 loads the attribute values into memory for use. In addition, as will be described in more detail below, in various embodiments, pre-processor code may be defined for a profile. Therefore, in Step 1625, the profile module 1000 runs any pre-processor code defined for the particular profile associated with the document. For instance, pre-processor code may be defined that instructs the profile module 1000 to access additional information from an external source to store along with the attributes for the document before loading the files into the system 1.

Furthermore, in various embodiments, default values may be defined for various attributes. These default values may be stored in the system 1 in various embodiments or may be stored externally and accessed by the profile module 1000 in other embodiments. Therefore, in Step 1630, the profile module 1000 assigns the defined default values to the corresponding attributes.

In various embodiments, the profile module 1000 processes any rules associated with indexes, shown as Step 1635. As previously described, indexes are attributes that may be used for indexing the document so that it (e.g., the files associated with the document) can be searched and retrieved from the system 1. In particular embodiments, these rules are defined in the profile identified for the particular document.

In various embodiments, the profile associated with the document may also define post-processor code. Thus, in Step 1640, the profile module 1000 runs the post-processor code associated with the profile identified for the document. Post-processor code may define any number of functions for the profile module 1000 to perform, such as saving the files associated with the document to a second storage location (e.g., a client's database) or emailing a confirmation to one or more defined users that the document has been uploaded into the system 1.

The profile module 1000 of various embodiments also executes steps for storing the document within the system 1. For instance, in various embodiments, the profile module 1000 automatically generates a file name for each file based on the values associated with one or more of the attributes defined in the profile identified for the document, shown as Step 1645 in FIG. 16B. As previously described, in various embodiments, the profile identified for the particular document includes a file mask 1203 that sets the naming convention for files associated with the document. Thus, in various embodiments, the profile module 1000 determines the naming convention for the files associated with the document from the file mask 1203.

Returning to the example in which a human resource department is using the system 1 to store employee documents, the department defines the file mask 1203 with the attributes last name and document type. For instance, the human resource department may upload an individual named Mark Smith's employment application into the system 1 via the upload module 700. Thus, the profile module 1000 extracts the last name (e.g., "Smith") from the attributes read from the attribute file. Furthermore, the file mask 1203 may indicate to use a special character, such as, for example, an underscore, as a separator between attributes. Therefore, the profile module 1000 renames the OCR file as "Smith_EmplApp.txt," the attribute file as "Smith_EmplApp.attr," and the image file as "Smith_EmplApp.tiff"

Furthermore, in Step 1650, the profile module 1000 creates a folder path name based on values associated with one or more of the attributes defined in the profile identified for the document. As previously described, in various embodiments, the profile also includes a folder mask 1202 that sets the naming convention for the folders to store the document in. As described above, this naming convention includes one or more attributes and the profile module 1000 automatically creates a folder path using the identified attributes in the folder mask 1202.

Therefore, returning to the example, the folder mask 1202 indicates the attributes last name, first name, and employee number. As a result, the profile module 1000 automatically builds out the folder path name using the employee's last name, first name, and employee number for employee documents for the particular employee. For instance, the profile module 1000 extracts the last name (e.g., "Smith"), the first name (e.g., "Mark"), and the employee number (e.g., "1234") from the attributes read from the attribute file. The resulting folder path name is "HR\Smith_Mark_1234." In various embodiments, this folder path name may be stored in the system so that the document (e.g., the three files) associated with the folder path name can be searched and located. For example, in one embodiment, the folder path name is stored as the location identifier in the documents table.

In various embodiments, the profile module 1000 also stores a number of records associated with the document in one or more tables of the system 1. For instance, the profile module 1000 stores a number of records in the tables included in the database 140 depicted in the system 1 shown in FIG. 1. In various embodiments, these particular records are utilized to manage the storage of the document in the system and are used to locate the document within the system 1. Thus, in Step 1655, the profile module stores a record associated with the document in a documents table.

In various embodiments, this record includes a document identifier that indentifies the document. In particular embodiments, this document identifier is unique. In addition, in various embodiments, the record includes a location identifier that identifies a storage location of the document in the system 1. Therefore, the location identifier can be used to locate the document in the system 1 if a user requests to retrieve the document from the system 1. Furthermore, in various embodiments, the record includes a profile identifier that is associated with the profile identified for the document and identifies a particular dynamic storage profile table.

In Step 1660, the profile module 1000 stores one or more records in an attributes table. In various embodiments, the attributes table stores information (e.g., values) indentified for the attributes defined for the profile. For instance, in one embodiment, the profile module 1000 stores a record for each attribute defined for the profile. In another embodiment, the profile module 1000 stores a record for a select number of the attributes (such as the attributes used as indexes) defined for the profile.

In particular embodiments, each record stored in the attributes table includes the document identifier and the profile identifier. Thus, each record can be linked to a particular document, a particular profile, and a particular dynamic storage profile table. Furthermore, in various embodiments, each record also includes an attribute identifier that identifies the particular attribute the record is being stored for and the value retrieved for the particular attribute. For example, the particular attribute may be the last name of the person associated with the document and the identifier may be a unique key that identifies this particular attribute and the value may be the text "Smith."

In addition, in various embodiments, the profile module 1000 stores a record for the document in the corresponding dynamic storage profile table, shown as Step 1665. In one embodiment, the dynamic storage profile table includes a field for each attribute defined for the particular profile. In another embodiment, the dynamic storage profile table includes a field for each attribute stored in the attributes table for records associated with the particular profile. Therefore, in various embodiments, the record stored for the document in the dynamic storage profile table includes the document identifier and the identified value in the corresponding field for each attribute stored in the attributes table.

Furthermore, in Step 1670, the profile module 1000 creates the folders as needed to store the document. For example, the profile module 1000 constructs a folder (e.g., "Smith_Mark_1234") in the "HR" folder (e.g., beginning folder in the directory structure as indicated by the folder mask 1202) in the document management system's storage medium 120. Thus, the profile module 1000 builds a hierarchical directory structure based on the folders.

In Step 1675, the profile module 1000 stores the electronic document (e.g., the three files) in at least one of the folders created in the system 1. For instance, in the example, the profile module 1000 stores the three files in the "Smith_Mark_1234" folder. Finally, in various embodiments, the profile module 1000 updates any reference tables in the system 1 with the indexes and location(s) (e.g., the folder path name) of the documents in the system 1, shown as Step 1680. For instance, the profile module 1000 updates the record stored in the documents table with the location of the document for the location identifier. Thus, these reference tables may be used to search for the document stored in the system 1.

An advantage provided by the profile module 1000 of various embodiments in using profiles to construct a directory structure and naming convention for documents stored in the document management system 1 is that such documents are stored in the system 1 with consistency. Thus, for these particular embodiments, using such profiles provides standardized directory structures for storing documents and standardized naming conventions for naming the files associated with such documents. As a result, documents are easier to search and locate within the system 1 in various embodiments.

There may be circumstances in which an organization (e.g., client) may want to change a document from one profile to another. For instance, an employee's related documents may have been entered into the system 1 for storage under the current employee profile however the employee may have left and is no longer employed by the organization. Therefore, the organization may want to change the employee's documents from the current employee profile to the terminated employee profile.

FIG. 16C illustrates a flow diagram of the profile module 1000 for changing a profile for a document according to various embodiments. In Step 1685, the profile module 1000 receives input to associate the electronic document with a difference profile. For example, a user enters the system 1, selects the document, and indicates on a user interface to change the current profile for the document to a different profile.

Thus, in various embodiments, the profile module 1000 retrieves the attributes defined for the new profile and receives values for the attributes, shown as Step 1690. In particular embodiments, the profile module 1000 may retrieve some of the values for the attributes from the OCR data (e.g., OCR file) obtained from the document when the document was loaded into the system 1. In other embodiments, the profile module 1000 may retrieve some of the values for the attributes from the attributes for the original profile and/or from the attribute file for the document. In other embodiments, the profile module 1000 may display the attributes associated with the new profile on an interface to the user and the user may enter the values for the attributes. Thus, in various embodiments, the profile module 1000 may use a combination of these techniques to receive the values for the attributes.

In Step 1691, the profile module 1000 creates the file name for the document in a similar fashion as previously described, e.g., the profile module 1000 creates the file name based on the file mask 1203 defined for the new profile that sets the naming convention for files associated with the document. In Step 1692, the profile module 1000 creates the folder path name for the document. Therefore, in various embodiments, the profile module 1000 creates a folder path using the identified attributes in the folder mask 1202 defined for the new profile in a similar fashion as previously described.

In Step 1693, the profile module 1000 updates the record for the document in the documents table to reflect the profile identifier for the new profile. Furthermore, in Step 1694, the profile module 1000 stores one or more records in the attributes table for one or more of the attributes defined for the new profile. Thus, in various embodiments, each record includes the document identifier, the profile identifier for the new profile, an attribute identifier for the particular attribute, and the value for the particular attribute.

In addition, in Step 1695, the profile module 1000 stores a record in the particular dynamic storage profile table associated with the new profile. As previously described, the dynamic storage profile table includes a field for each attribute stored in the attributes table associated with the particular profile. Furthermore, the record stored in the dynamic storage profile table includes the document identifier and the value stored in the corresponding attribute field.

In various embodiments, it may be desirable to also move the location of the document as a result of changing the profile for the document. For example, the folder mask and the file mask may be defined differently for the terminated employee profile and the current employee profile. As a result, the profile module 1000 may also move the document to a new location within the system 1.

In Steps 1696 and 1697, the profile module 1000 creates the folders based on the folder mask 1202 and stores the files associated with the document in at least one of the folders created in the system 1. Finally, in Step 1698, the profile module 1000 updates any reference tables in the system 1, as previously described. For instance, the profile module 1000, in various embodiments, updates the record for the document in the documents table to reflect the new location identifier for the particular folder the document has been moved into.

Security Module

In various embodiments, the security module 1700 is configured to set access rights for each of the system's users by defining teams of users (e.g., teams of individual people who use the system). By the same token, in various embodiments, the security module 1700 is also adapted to define one or more groups of teams, and to define which functions the various teams within each group of teams may perform on documents stored within the document management system 1. For example, the security module 1700 may specify that all of the users on two particular teams that are part of a particular group may have: (1) view rights to a first particular set of documents; and (2) edit rights to a second particular set of documents. In particular embodiments, all user access rights are defined at the group level (and are not defined based on the user's team or organizational affiliations). In other embodiments, user access rights may be defined based, at least in part, on other factors, such as team or organizational affiliation.

In various embodiments, groups are the entities within the system 1 provided with rights. Groups are made up of one or more teams (e.g., teams are made members of groups). Thus, individual users inherit rights in the system 1 through being members of teams that are members of groups. In various embodiments, these rights include such functions as: (1) accessing a document; (2) viewing a document; (3) downloading a document; (4) moving a document to a different location within the system 1; (5) emailing a document; (6) copying a document; (7) deleting a document; (8) opening a subset of documents in a main folder; (9) displaying the attributes for a document; (10) editing the attributes of a document; (11) moving a document (or folder) to a different profile; and/or (12) accessing the register for a document.

FIG. 17 provides an example of a user screen provided by the security module 1700 according to an embodiment of the invention. This screen allows an organization to add and/or edit user information in the document management system 1 based on a number of fields provided on the screen. For instance, the "Authentication By" field 1701 indicates what process is used to authenticate a user logging into the system. For example, one such process may be via lightweight directory access protocol (LDAP). Thus, the organization will indicate in the "Authentication By" field 1701 to use LDAP and provide in the "LDAP UserName" field 1702 the user name assigned on the organization's LDAP server to the user.

LDAP is an Internet protocol that can be used to access a server (e.g., a LDAP server). In this case, the document management system 1 may be integrated with an organization's (e.g., client's) security system. A user associated with the organization logs onto the document management system 1 and provides a password. The system 1 sends the password via LDAP to the organization's own security system to verify the password. In various embodiments, this provides the advantage of allowing the organization to manage security for the documents stored in the system 1 as opposed to relying on the system 1 to internally manage security for the organization. Thus, the organization may have more confidence in knowing their documents are securely stored within the system 1. Other processes that may used to authenticate a user include Microsoft's® Active Directory® or via a database.

Other fields on the user security screen may include the "Record Status" field 1703, the "Password Status" field 1704, and the "Employee Type" field 1705. In various embodiments, the "Record Status" field 1703 may be set to "Active" or "Not Active." "Active" allows the user to navigate as normal through the document management system 1. "Not Active" turns the user's access to the system 1 off without having to change the user's security level or delete the user from the system 1. In various embodiments, the "Password Status" field 1704 allows for a number of choices to be selected to provide the user with control over the user's password. For instance, the selections may include allowing the user to change his password once, forcing the user to change his password after the user has logged into the system 1 for the first time, and not allowing the user to change his password at all. In various embodiments, the "Employee Type" field 1705 may be customized by an organization to include such selections as "Exempt or Non-Exempt", "Part-Time or Full-Time", or any other desired fields. These and other fields may be included on the user security screen according to various embodiments, as further shown in FIG. 17.

Furthermore, as previously described, in various embodiments, a user of the system 1 is made a member of one or more teams. Thus, in various embodiments, a user's memberships 1706, 1707 may be viewed at the bottom of the security screen, as shown in FIG. 17. The first drop down selector 1706 displays what teams the user is a member of for the particular organization. The second drop down selector 1707 displays all the user's memberships. For example, this drop down selector 1707 may display the teams the user is a member of for other organizations.

In further embodiments, a team management screen is also provided to manage teams and membership in these teams, as shown in FIG. 18. In various embodiments, this screen allows an organization to edit and add teams, see the users that are members of teams, add or remove users to/from teams, and see the access groups the teams are members of. For instance, the screen shown in FIG. 18 is displaying information for the "HR Demo—[MyOrg Administrator UT]" team 1801. This team currently has one member 1802, "System Admin." This member may be removed from the team by simply selecting the "Remove" button beside the user's name. In addition, the screen provides a listing of available users 1803. These users may be added to the team if desired by checking the box next to the particular user's name and selecting the "Add Selected User" button. Furthermore, the groups for which the team is a member of can be viewed via the drop down selector 1804 at the bottom of the screen.

As previously described, in various embodiments, a particular user's security rights are based on the particular group that they are associated with. In addition, each group is made up of various teams of individual users. FIG. 19 displays a typical group management screen used to manage groups and membership in the groups according to one embodiment of the invention. In various embodiments, this screen allows an organization to edit or add teams or groups, view the users that are members of any group through the associated team, add or remove users or teams to/from a group, and view teams that are members of any group.

In the embodiment shown, the screen is set up in a similar fashion as the team management screen previously described. For instance, the top of the screen displays the name of the current group 1901 (e.g., "HR Demo—[MyOrg Administrator AG]") for which information is displayed on the screen. In addition, the screen displays the current teams 1902 that are members of the group (e.g., "MyOrg Administrator UT"). A team may be removed as a member by selecting the "Remove" button beside the team's name. Furthermore, the screen displays the available teams 1903 that may be added as members to the group (e.g., "Regional Manager UT"). An available team may be added to the group by simply selecting the "Add" button beside the particular team's name.

In addition to each group being assigned specific program functions the members of the group can perform, in various embodiments each group is also assigned an authorization level. This authorization level may be associated with every program function assigned to the group or individual authorization levels may be associated with each program function assigned to the group. Thus, a member of a group can only perform one of the assigned program functions on a particular document if the member has the appropriate authorization level to perform the function on the document. For instance, in various embodiments, each group is assigned a numerical authorization level. The level may range from 000 to 200 with an authorization level of 200 being the highest level. Therefore, a group can be assigned an authorization level from 000 to 200.

Furthermore, in various embodiments, folders of the system 1 and/or the files stored in the folders are assigned a level of required authorization. Thus, the level of required authorization is assigned to a folder and this imputes the level of required authorization to every folder and file contained within the folder, or the level of required authorization is directly assigned to the file. In addition, the level of required authorization corresponds to the authorization level assigned to groups. Therefore, in the example given above, the level of required authorization ranges from 000 to 200. As a result, if a user is a member of a team that is a member of a group with an authorization level of 100, the user can only perform functions assigned to the group on files with an required level of authorization level less than or equal to 100.

In addition to setting access rights for all users by utilizing groups and teams, the security module 1700 in various embodiments is also configured to validate whether a user, who has requested to perform a particular function on a document stored in the system 1, is authorized to perform the function on the document. Thus, FIG. 20 illustrates a flow diagram of the security module 1700 validating a user's request according to various embodiments. This flow diagram may correspond to the steps carried out by the processor 360 in the server 110 shown in FIG. 3 as it executes the security module 1700 in the server's 110 RAM memory 367 according to various embodiments.

In Step 2010, the security module 1700 receives a request from a user to perform a program function on a document stored in the system 1. As previously discussed, program functions may include accessing a document, viewing a document, downloading a document, moving a document to a different location within the system 1, emailing a document, copying a document, deleting a document, opening a subset of documents in a main folder, displaying the attributes for a document, editing the attributes of a document, moving a document (or folder) to a different profile, and/or accessing the register for a document.

For instance, a user of the system 1 who works in an employee benefits department of an organization may want to copy an employee's application for healthcare benefits. Thus, the user requests a copy of the document from the system 1 via a Web interface over the Internet.

In Step 2020, the security module 1700 determines that the user is a member of a team associated with a group that has the sufficient authorization level and the sufficient right to perform the requested function on the document. Thus, in various embodiments, the security module 1700 first determines whether the user is a member of a team associated with a group that has rights to perform the requested function. Returning to the example, the module 1700 determines whether the user is a member of a team associated with a group that has the right to copy a document. For instance, in this case, the user is a member of the "Benefits Department" team and this team is a member of the "Employee Documents Review" group. This group has rights to access, view, download, and/or copy a document. As a result, the user is a member of a team associated with a group that has the appropriate right to perform the copy function.

Furthermore, the module 1700 of various embodiments determines whether the group has the proper authorization level to perform the task on the particular document. Thus, returning to the example, the "Employee Documents Review" group may be assigned an authorization level of 150. The security module 1700 will obtain the level of required authorization for the document to determine whether the authorization level for the "Employee Documents Review" group exceeds the required threshold to copy the document. If the required authorization for the document is set to 160, the module 1700 determines that the group does not have the proper authorization level (e.g., the group only has an authorization level of 150) to copy the document and the module 1700 denies the employee's request, shown as Step 2030. If the required authorization for the document is set to 100, the module 1700 determines that the group does have the proper authorization level and the module 1700 provides access to the user to perform the requested function, shown as Step 2040. Therefore, the module 1700 provides the employee with access to copy the document.

In various embodiments, the security module 1700 also includes an application security function. This function is configured to secure the folder collections for a particular organization. Thus, this function is used to associate particular folders and/or files with an organization. As a result, a user associated with the organization only can view documents associated with the particular organization when the user is logged into the system 1. In various embodiments, this helps to minimize the number of documents a user must navigate when using the system 1. In addition, the application security function provides added security in various embodiments because an organization can store documents within the system 1 without having other organizations view what documents (e.g., types of documents) the organization is storing in the system 1. For example, this function can provide a significant advantage to an organization such as a law firm who stores confidential documents in the system 1.

Furthermore, various embodiments of the security module 1700 are configured to provide affiliations for an organization's documents stored in the system 1. Affiliations provide parties external to the system 1 with limited access to an organization's documents. This is accomplished in various embodiments by setting a separate folder structure that is specific to an "affiliate," and providing access to the folder structure to the "affiliate" (e.g., associated external third party).

For example, an organization may set up an affiliation with a supplier and the supplier uses the system 1 to upload invoices directly into the system 1 for the organization. As a result, the organization does not have to go through the additional steps of receiving the invoices from the supplier and uploading the invoices into the system 1. In addition, an organization may set up an affiliation to allow the affiliate to access documents in the system 1. For example, an organization may be a party to litigation and the organization may set up an affiliation to provide access to certain documents to opposing counsel. Thus, in various embodiments, the organization can eliminate added steps the organization would be required to perform and save time and money to upload documents into the system 1.

In further embodiments, the security module 1700 also provides a document access register. This register keeps track of every activity (such as copy a document) users of the system 1 perform within the system 1. In various embodiments, the module 1700 is configured to record on the register every activity performed by a user. For instance, the module 1700 records these activities on the register along with the user's identifier, such as the user's login identification. As a result, the system 1 can provide an organization with a record of all activities perform on the organization's documents and the user who performed the activity. Thus, an organization can track the work (or lack of work) performed by users in the system 1.

Search Module

In various embodiments, the search module 2100 is configured to locate one or more documents in the document management system 1 based on search criteria provided by a user. In various embodiments, these criteria are based at least in part (and, in various embodiments, primarily) on the attributes defined in the profiles used to upload the documents into the system 1. For example, the user may have selected a profile to upload a human resource document that defines one of the attributes to be the employee's last name. Thus, when the document is uploaded into the system 1, the employee's last name is obtained from the document (e.g., as an OCR field) or received as an input from the user or other source and is saved in the system 1 as an attribute for the document. For instance, in the embodiments in which the profile is associated with a dynamic storage profile table, the attribute employee's last name is defined as a field in the dynamic storage profile table and the value for this attribute (e.g., "Smith") is stored in this field for the record in the table associated with the particular document. As a result, the user can select the employee's last name as search criteria and the system 1 queries the dynamic storage profile table for records (e.g., documents) that meet the search criteria.

Thus, in various embodiments, the user can search for documents in the system 1 based on any number of attributes (e.g., any combination of attributes). In addition, the search criteria are dynamic in various embodiments because attributes can be added or removed from the system 1 by editing profiles.

For example, FIG. 21 displays an exemplary search screen provided by the search module 2100 according to various embodiments of the invention. In this particular embodiment, the user selects a particular profile using the drop down selector 2101 located at the top left corner of the screen. As a result, the screen lists a number of search keys (e.g., attributes) defined for the selected profile. For instance, in this case, the user has selected the profile "Current Employee" and various search keys are listed, such as "Customer Name/Number" 2102, "Hire Year" 2103, and "Employee ID" 2104.

The user may complete as many or as few of the search fields as needed to search for the desired documents. The user then selects the "Search" button 2105 and the search module 2100 searches the system 1 to locate documents based on the completed search fields. In various embodiments, the module 2100 displays the results of the search on a separate screen as a listing. The user scrolls down through the list of search results and selects a desired document from the search results. In various embodiments, the display may include other information along with the document name, such as the folder the document is located in, the date the document was uploaded into the system 1, and other various attributes associated with the document. Once the user has selected a document, the user can select to perform a program function on the document as described above.

In various embodiments, the search module 2100 is further configured to gather information from the security module 1700 so as to limit the search results. For instance, the search module 2100 gathers from the security module 1700 what organization(s) the user performing the search is a member of. Thus, the search module 2100 only displays documents and folders associated with these organization(s).

Furthermore, in various embodiments, the search module 2100 is configured to perform full text searches. To search documents that have been uploaded into the system 1 using OCR, the user can simply type the words or phrases 2201 the user would like to search for, as shown on the search screen displayed in FIG. 22. The module 2100 searches the text files for the documents in the system 1 and provides a listing of the documents that contain the particular words and phrases. In various embodiments, the module 2100 ranks the documents listed in the search results according to how well the text of the documents matches the words and phrases entered to search and provides the page numbers on which the words and phrases were located.

In addition, the user can select a particular document from the search results and the module 2100 displays the words or phrases located within the document 2202. In various embodiments, the module 2100 also highlights each word or phrase with a different colored background highlight.

Report Module

A report module 2300 is provided in further embodiments of the document management system 1. In various embodiments, the module 2300 provides a screen from which the user can select a profile 2301 that user wishes to report on (See FIG. 23). In addition, in various embodiments, the user can select additional reporting criteria, such as a department in an organization 2302, a file label 2303, or a document group 2304.

Once the user has selected all of the desired reporting criteria, the user selects the "Search" button 2305, and the module 2300 displays the results 2306 at the bottom of the screen. Once the results 2306 are displayed, the user can perform several functions according to various embodiments. For instance, the user can view all of the files for a folder subset, can print the report in several different formats, such as Excel®, PDF, CSV, MHTML, and XML, and can email a request for a missing file to an individual.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

What is claimed is:

1. A computer system for storing a plurality of electronic documents, the system comprising:
a first dynamic storage profile table;
a second dynamic storage profile table;
memory; and
at least one processor coupled to the memory, the at least one processor being adapted to execute an upload module and a profile module, wherein:
(A) the upload module is adapted to:
(1) receive an electronic document that is associated with a first profile, the first profile defining a first set of one or more attributes,
(2) identify values associated with the electronic document for at least one attribute of the first set of one or more attributes defined for the first profile, and
(3) upload the electronic document to the memory; and
(B) the profile module is adapted to:
(1) store the electronic document in a storage medium,
(2) store a first record associated with the electronic document in a first table, the first record comprising:
(a) a document identifier that identifies the electronic document,
(b) a location identifier that identifies a storage location of the electronic document, and
(c) a first profile identifier that is associated with the first profile and identifies the first dynamic storage profile table,
(3) store a second record in a second table, the second record being a record for at least one attribute of the first set of one or more attributes defined for the first profile, the second record comprises:
(a) the document identifier,
(b) the first profile identifier,
(c) a first attribute identifier that identifies the particular attribute of the first set of one or more attributes, and
(d) the value of the identified values identified for the particular attribute of the first set of one or more attributes,
(4) store a third record in the first dynamic storage profile table, the first dynamic storage profile table comprises a field for each attribute of the first set of one or more attributes stored in the second table for the electronic document, and the third record comprises:
(a) the document identifier, and
(b) the identified value stored in the corresponding field for each attribute of the first set of one or more attributes stored in the second table for the electronic document,
(5) receive input to associate the electronic document with a second profile, the second profile defining a second set of one or more attributes, and
(6) in response to receiving the input to associate the electronic document with a second profile:
(a) receive values associated with the electronic document for at least one attribute of the second set of one or more attributes defined for the second profile,
(b) update the first record in the first table with a second profile identifier that is associated with the second profile and identifies the second dynamic storage profile table,
(c) store a fourth record for at least one attribute of the second set of one or more attributes defined for the second profile in the second table, the fourth record comprises:
(1) the document identifier,
(2) the second profile identifier,
(3) a second attribute identifier that identifies the particular attribute of the second set of one or more attributes, and (4) the value of the identified values identified for the particular attribute of the second set of one or more attributes, and (d) store a fifth record in the second dynamic storage profile table, the second dynamic storage profile table comprises a field for each attribute of the second set of one or more attributes stored in the second table for the electronic document, and the fifth record comprises:
(1) the document identifier, and
(2) the identified value stored in the corresponding field for each attribute of the second set of one or more attributes stored in the second table for the electronic document.

2. The system of claim 1, wherein the electronic document comprises one or more files.

3. The system of claim 1, wherein the profile module is adapted to, in response to the electronic document being uploaded to the memory:
automatically generate a first set of one or more folders on the storage medium based on the identified value for at least one attribute of the first set of one or more attributes defined for the first profile;
automatically generate a file name assigned to the electronic document based on the identified value for at least one attribute of the first set of one or more attributes defined for the first profile; and
store the electronic document in a particular folder of the first set of one or more folders.

4. The system of claim 3, wherein the location identifier identifies the particular folder of the first set of one or more folders.

5. The system of claim 3, wherein the second dynamic storage profile table is adapted to be searched based on the values stored in each field to identify and to locate the electronic document.

6. The system of claim 3, wherein the profile module is adapted to, in response to receiving the input to associate the electronic document with the second profile:
automatically generate a second set of one or more folders on the storage medium based on the identified value for at least one attribute of the second set of one or more attributes defined for the second profile;
automatically generate a file name assigned to the electronic document based on the identified value for at least one attribute of the second set of one or more attributes defined for the first profile;
store the electronic document in a particular folder of the second set of one or more folders; and
update the first record in the first table with a second location identifier that identifies the particular folder of the second set of one or more folders.

7. The system of claim 1, wherein the at least one processor comprises a single processor.

8. The system of claim 1, wherein the at least one processor comprises a first processor executing the upload module and a second processor executing the profile module.

9. The system of claim 1, wherein the upload module is further adapted to:
determine a value signifying that the first profile is correctly associated with the electronic document based on values being identified for one or more attributes of the first set of one or more attributes defined for the first profile; and
in response to the value exceeding a predetermined threshold, automatically upload the electronic document to the memory.

10. The system of claim 9, wherein the upload module is further adapted to select the first profile from a set of one or more profiles based on the values being identified for one or more attributes of the first set of one or more attributes defined for the first profile.

11. The system of claim 1, further comprising:
a scanner adapted to scan a physical document that corresponds to the electronic document, and
a scan module adapted to, in response to the scanner scanning the first physical document:
(1) generate the electronic document based on the physical document,
(2) perform optical character recognition on the electronic document to identify at least a portion of the values associated with the first set of one or more attributes defined in the first profile, and
(3) locate the portion of the values on the electronic document based on a set of rules defined in the first profile.

12. The system of claim 1, wherein:
the first profile incorporates processing rules that comprise code to verify that values for one or more attributes of the first set of one or more attributes have been identified; and
the profile module is adapted to:
execute the processing rules prior to storing the electronic document; and
in response to the values for the one or more attributes not being verified, not store the electronic document in the storage medium.

13. The system of claim 1, wherein:
the profile incorporates processing rules that comprise code to obtain values for one or more attributes of the first set of one or more attributes from an external resource; and
the profile module is adapted to execute the processing rules to obtain the values for the one or more attributes prior to storing the electronic document in the storage medium.

14. A non-transitory computer-readable medium storing computer-executable instructions for:
(A) in response to receiving an electronic document that is associated with a first profile, the profile defining a first set of one or more attributes:
(1) identifying values associated with the electronic document for at least one attribute of the first set of one or more attributes defined for the first profile;
(2) storing the electronic document in a storage medium;
(3) storing a first record associated with the electronic document in a first table, the first record comprising:
(a) a document identifier that identifies the electronic document,
(b) a location identifier that identifies a storage location of the electronic document, and
(c) a first profile identifier that is associated with the first profile and identifies the first dynamic storage profile table;
(4) storing a second record in a second table, the second record being a record for at least one attribute of the first set of one or more attributes defined for the first profile, the second record comprises:
(a) the document identifier,
(b) the first profile identifier,
(c) a first attribute identifier that identifies the particular attribute of the first set of one or more attributes, and (d) the value of the identified values identified for the particular attribute of the first set of one or more attributes;

(5) storing a third record in the first dynamic storage profile table, the first dynamic storage profile table comprises a field for each attribute of the first set of one or more attributes stored in the second table for the electronic document, and the third record comprises:
(a) the document identifier, and
(b) the identified value stored in the corresponding field for each attribute of the first set of one or more attributes stored in the second table for the electronic document; and (B) in response to receiving input to associate the electronic document with a second profile:
(1) receiving values associated with the electronic document for at least one attribute of the second set of one or more attributes defined for the second profile;
(2) updating the first record in the first table with a second profile identifier that is associated with the second profile and identifies the second dynamic storage profile table;
(3) storing a fourth record for at least one attribute of the second set of one or more attributes defined for the second profile in the second table, the fourth record comprises:
(a) the document identifier,
(b) the second profile identifier,
(c) a second attribute identifier that identifies the particular attribute of the second set of one or more attributes, and
(d) the value of the identified values identified for the particular attribute of the second set of one or more attributes; and
(4) storing a fifth record in the second dynamic storage profile table, the second dynamic storage profile table comprises a field for each attribute of the second set of one or more attributes stored in the second table for the electronic document, and the fifth record comprises:
(a) the document identifier, and
(b) the identified value stored in the corresponding field for each attribute of the second set of one or more attributes stored in the second table for the electronic document.

15. The computer-readable medium of claim 14, wherein the electronic document comprises one or more files.

16. The computer-readable medium of claim 14, wherein the medium comprises computer-executable instructions for:
automatically generating a first set of one or more folders on the storage medium based on the identified value for at least one attribute of the first set of one or more attributes defined for the first profile;
automatically generating a file name assigned to the electronic document based on the identified value for at least one attribute of the first set of one or more attributes defined for the first profile; and
storing the electronic document in a particular folder of the first set of one or more folders.

17. The computer-readable medium of claim 16, wherein the location identifier identifies the particular folder of the first set of one or more folders.

18. The computer-readable medium of claim 16, wherein the medium comprises computer-executable instructions for:
in response to receiving the input to associate the electronic document with the second profile:
automatically generating a second set of one or more folders on the storage medium based on the identified value for at least one attribute of the second set of one or more attributes defined for the second profile;
automatically generating a file name assigned to the electronic document based on the identified value for at least one attribute of the second set of one or more attributes defined for the first profile;
storing the electronic document in a particular folder of the second set of one or more folders; and
updating the first record in the first table with a second location identifier that identifies the particular folder of the second set of one or more folders.

19. The computer-readable medium of claim 14, wherein the medium comprises computer-executable instructions for:
determining a value signifying that the first profile is correctly associated with the electronic document based on values being identified for one or more attributes of the first set of one or more attributes defined for the first profile; and
in response to the value exceeding a predetermined threshold, automatically uploading the electronic document to the memory.

20. The computer-readable medium of claim 19, wherein the medium comprises computer-executable instructions for selecting the first profile from a set of one or more profiles based on the values being identified for one or more attributes of the first set of one or more attributes defined for the first profile.

21. The computer-readable medium of claim 14, further comprising:
a scanner adapted to scan a physical document that corresponds to the electronic document, and
a scan module adapted to, in response to the scanner scanning the first physical document:
(1) generate the electronic document based on the physical document,
(2) perform optical character recognition on the electronic document to identify at least a portion of the values associated with the first set of one or more attributes defined in the first profile, and
(3) locate the portion of the values on the electronic document based on a set of rules defined in the first profile.

22. The computer-readable medium of claim 14, wherein:
the first profile incorporates processing rules that comprise code to verify that values for one or more attributes of the first set of one or more attributes have been identified; and
the medium comprises computer-executable instructions for:
executing the processing rules prior to storing the electronic document; and
in response to the values for the one or more attributes not being verified, not storing the electronic document in the storage medium.

23. The computer-readable medium of claim 14, wherein:
the profile incorporates processing rules that comprise code to obtain values for one or more attributes of the first set of one or more attributes from an external resource; and
the medium comprises computer-executable instructions for executing the processing rules to obtain the values for the one or more attributes prior to storing the electronic document in the storage medium.

* * * * *

UNITED STATES PATENT AND TRADEMARK OFFICE
CERTIFICATE OF CORRECTION

PATENT NO. : 8,228,542 B2  Page 1 of 1
APPLICATION NO. : 12/415625
DATED : July 24, 2012
INVENTOR(S) : Coley et al.

It is certified that error appears in the above-identified patent and that said Letters Patent is hereby corrected as shown below:

Title Page:
Item "(73) Assignee: 1$^{st}$ Management Services, Inc." should read
Item --(73) Assignee: IST Management Services, Inc.--

Signed and Sealed this
Thirteenth Day of November, 2012

David J. Kappos
*Director of the United States Patent and Trademark Office*